United States Patent
Tezaur

(10) Patent No.: US 8,687,912 B2
(45) Date of Patent: Apr. 1, 2014

(54) ADAPTIVE OVERSHOOT CONTROL FOR IMAGE SHARPENING

(75) Inventor: Radka Tezaur, Mountain View, CA (US)

(73) Assignee: Nikon Corporation, Tokyo (JP)

( * ) Notice: Subject to any disclaimer, the term of this patent is extended or adjusted under 35 U.S.C. 154(b) by 238 days.

(21) Appl. No.: 13/131,116

(22) PCT Filed: Mar. 10, 2010

(86) PCT No.: PCT/US2010/026860
§ 371 (c)(1),
(2), (4) Date: May 25, 2011

(87) PCT Pub. No.: WO2010/107464
PCT Pub. Date: Sep. 23, 2010

(65) Prior Publication Data
US 2011/0229053 A1 Sep. 22, 2011

Related U.S. Application Data

(60) Provisional application No. 61/160,627, filed on Mar. 16, 2009.

(51) Int. Cl.
*G06K 9/40* (2006.01)

(52) U.S. Cl.
USPC ............ 382/263; 382/168; 382/171; 382/194; 382/260; 382/261; 382/262; 382/264; 382/266

(58) Field of Classification Search
USPC .................. 382/168, 171, 194, 260–264, 266
See application file for complete search history.

(56) References Cited

U.S. PATENT DOCUMENTS

| | | | | |
|---|---|---|---|---|
| 5,050,223 A | * | 9/1991 | Sumi | 382/266 |
| 5,787,195 A | * | 7/1998 | Tsujimoto et al. | 382/176 |
| 5,880,767 A | * | 3/1999 | Liu | 347/251 |
| 6,175,656 B1 | * | 1/2001 | Hoang | 382/260 |
| 6,847,738 B1 | * | 1/2005 | Scognamiglio et al. | 382/260 |
| 7,068,851 B1 | * | 6/2006 | Berkner | 382/261 |
| 7,068,852 B2 | * | 6/2006 | Braica | 382/266 |
| 7,110,044 B2 | * | 9/2006 | Wang et al. | 348/627 |
| 7,130,483 B2 | * | 10/2006 | Kim | 382/266 |

(Continued)

FOREIGN PATENT DOCUMENTS

JP 2004-252504 9/2004

OTHER PUBLICATIONS

Adaptive Directional-control., Bruna et al., SPIE 0277-786X, 2008, pp. 1-8.*
PCT International Search Report and Written Opinion for PCT/US2010/26860 (related to present application) dated Apr. 22, 2010, Nikon Corporation.

(Continued)

*Primary Examiner* — Jayesh A Patel
(74) *Attorney, Agent, or Firm* — Roeder & Broder LLP

(57) ABSTRACT

A method for sharpening a captured image includes the steps of (i) identifying a plurality of edge pixels in the captured image, (ii) reviewing the plurality of edge pixels to identify one or more line pixels, and one or more non-line pixels in the captured image (354), and (iii) sharpening the captured image utilizing a first level of overshoot control for the non-line pixels (362), and utilizing a second level of overshoot control for the line pixels (360) The method also includes the steps of (i) identifying an intensity value for each of a plurality of neighboring pixels that are positioned near a selected pixel in a predetermined pixel window that have the highest intensity values and the lowest intensity values.

21 Claims, 12 Drawing Sheets

(56) References Cited

U.S. PATENT DOCUMENTS

| | | | |
|---|---|---|---|
| 7,269,296 B2* | 9/2007 | Wang et al. | 382/275 |
| 7,333,673 B2* | 2/2008 | Wang | 382/269 |
| 7,957,606 B2* | 6/2011 | Schoner | 382/263 |
| 2001/0022622 A1* | 9/2001 | Eiho et al. | 348/252 |
| 2002/0076105 A1* | 6/2002 | Lee | 382/190 |
| 2002/0102029 A1* | 8/2002 | Sekiguchi et al. | 382/243 |
| 2002/0135702 A1* | 9/2002 | Yamaki | 348/625 |
| 2002/0145678 A1* | 10/2002 | Suzuki et al. | 348/675 |
| 2002/0181800 A1* | 12/2002 | Hamada et al. | 382/266 |
| 2002/0196470 A1* | 12/2002 | Kawamoto et al. | 358/3.06 |
| 2003/0081854 A1* | 5/2003 | Deshpande | 382/261 |
| 2003/0189579 A1* | 10/2003 | Pope | 345/660 |
| 2005/0248687 A1* | 11/2005 | Lee et al. | 348/606 |
| 2006/0087692 A1* | 4/2006 | Chang | 358/3.01 |
| 2006/0245665 A1* | 11/2006 | Lee et al. | 382/266 |
| 2007/0019242 A1 | 1/2007 | Hirayama | |
| 2008/0199099 A1* | 8/2008 | Michel et al. | 382/260 |
| 2008/0298712 A1* | 12/2008 | Kang | 382/266 |
| 2009/0196524 A1* | 8/2009 | Godin | 382/263 |

OTHER PUBLICATIONS

PCT Demand Chapter II with Reply to Written Opinion for PCT/US2010/26860 (related to present application) filed Jan. 13, 2011, Nikon Corporation.

PCT Notification of Transmittal of International Preliminary Report on Patentability for PCT/US2010/26860 (related to present application) dated Mar. 29, 2011, Nikon Corporation.

Bruna, Arcangelo; Buemi, Antonio; Guarnera, Mirko; Santoro, Gaetano; Adaptive Directional Sharpening with Overshoot Control, Proc. of SPIE-IS&T Electronic Imaging, 2008, SPIE vol. 6812, 681213, © 2008 SPIE-IS&T.

Safonov, Ilia V.; Rychagov, Michael N.;Kang, KiMin; Kim, Sang Ho;Adaptive Sharpening of Photos, 2008, SPIE-IS&T/vol. 6807, Proc. of SPIE-IS&T Electronic Imaging, ©2008 SPIE-IS&T-0277-786X/08.

Japanese Patent Office, Notice of Reasons for Rejection for Japanese Patent Application No. 2012-500838, dated Feb. 28, 2012. Only English translation is provided.

Japanese Patent Office, Notice of Reasons for Rejection (Final) for Japanese Patent Application No. 2012-500838, dated May 29, 2012. Only English translation is provided.

* cited by examiner

| Original Overshoot | Transformed Overshoot |
|---|---|
| O1 | T1 |
| O2 | T2 |
| O3 | T3 |
| O4 | T4 |

| 11 | 9 | 10 | 10 | 9 | 11 | 10 |

| 0.9 | 1 | 0.9 | 1 |
|---|---|---|---|
| 0.7 | 0.6 | 0.8 | 0.7 |
| 0.2 | 0.1 | 0 | 0.2 |
| 0 | 0.1 | 0 | 0.1 |

| 0.2 | 0 | 0 | 0.1 |
|---|---|---|---|
| 0.3 | 0.2 | 0.1 | 0.2 |
| 0.7 | 0.6 | 0.5 | 0.7 |
| 0.8 | 1 | 0.9 | 0.9 |

Fig. 12B

ADAPTIVE OVERSHOOT CONTROL FOR IMAGE SHARPENING

RELATED INVENTIONS

This application claims priority on U.S. Provisional Application Ser. No. 61/160,627, filed Mar. 16, 2009 and entitled "ADAPTIVE OVERSHOOT CONTROL FOR IMAGE SHARPENING." As far as permitted, the contents of U.S. Provisional Application Ser. No. 61/160,627 are incorporated herein by reference.

BACKGROUND

Cameras are commonly used to capture an image of a scene that includes one or more objects. Unfortunately, some of the images are blurred. For example, movement of the camera, and/or movement of the objects in the scene during the exposure time of the camera can cause the image to be blurred. Further, an out of focus image is also blurred.

Currently, there are some post processing, digital image processing software applications that are used to increase that sharpness of blurred images. One common type of sharpening software amplifies high frequency areas of the captured image. Unfortunately, the sharpening software often produces a halo effect, e.g. ringing near the edges in the sharpened image, and noise magnification.

Recently, sharpening software has been developed that attempts to suppress the halo effect in sharpened images. Unfortunately, this halo suppression software is not completely satisfactory.

SUMMARY

The present invention is directed to an image apparatus and method for sharpening a captured image using a processor to perform the steps of (i) identifying a plurality of edge pixels in the captured image; (ii) reviewing the plurality of edge pixels to identify one or more line pixels, and one or more non-line pixels in the captured image, and; (iii) sharpening the captured image utilizing a first level of overshoot control for the non-line pixels, and utilizing a second level of overshoot control for the line pixels, wherein the first level of overshoot control is different than the second level of overshoot control.

As an overview, in certain embodiments, the method disclosed herein provides different levels of overshoot control during the sharpening of different pixels in the image. In one embodiment, (i) line pixels are edge pixels that are part of a line-like edge in the captured image, and (ii) non-line pixels are the remaining pixels in the captured image. For example, non-line pixels include (i) edge pixels that are part of a step-like edge between two objects, and (ii) pixels that are not classified as edge pixels (e.g. smooth pixels). As provided herein, the non-line pixels require a relatively high, first level of overshoot control to reduce halos in the adjusted image, and the line pixels require a relatively low, second level of overshoot control to allow significant overshoots in the area between these close pairs of edge pixels and reduce the painterly appearance of the adjusted image. Stated in another fashion, different types of pixels in a blurred image need different types of overshoot control and strong overshoots are needed to properly restore local contrast in areas of an image that contain lines or other fine features.

As used herein the term "L(i,j)" represents the estimate for the local minimum intensity value in the vicinity of pixel (i,j), and the term "H(i,j)" represents the estimate for the local maximum intensity value in the vicinity of pixel (i,j).

An overshoot is the difference between the sharpened pixel value (either $p_s(i,j)$ or $p_{new}(i,j)$, depending on whether one speaks about the overshoot size before overshoot control is applied or after) and (i) the local minimum intensity value (L(i,j)), if the sharpened pixel value is lower than local minimum intensity value or (ii) the local maximum intensity value (H(i,j)) if the sharpened pixel value is bigger than the local maximum intensity value.

Overshoot control means changing the size of overshoots in the sharpened image.

As provided herein, in certain embodiments, the first level of overshoot control is stronger than the second level of overshoot control, and the second level of overshoot control is very weak to approximately no overshoot control. As non-exclusive examples, the first level of overshoot control can be approximately 2, 4, 6, 8, 10, 12, or 14 times stronger than the second level of overshoot control. For example, the first level of overshoot control can be approximately 10 times stronger (maximum allowed size of overshoot is ten times smaller for the strong overshoot control) than the second level of overshoot control.

The present invention is also directed to a method for sharpening a captured image that includes the steps of (i) selecting a pixel in the captured image; (ii) identifying an intensity value for each of a plurality of neighboring pixels that are positioned near the selected pixel in a predetermined pixel window; (iii) reviewing several of the neighboring pixels that have the highest intensity values to select a selected high intensity value for the pixel window; (iv) reviewing several of the neighboring pixels that have the lowest intensity values to select a selected low intensity value for the pixel window; and (v) sharpening the captured image and applying overshoot control to establish a sharpened intensity value for the selected pixel.

For example, the step of reviewing several of the neighboring pixels that have the highest intensity values includes the step of averaging several of the neighboring pixels that have the highest intensity values to determine the selected high intensity value for the pixel window; and the step of reviewing several of the neighboring pixels that have the lowest intensity values includes the step of averaging several of the neighboring pixels that have the lowest intensity values to determine the selected low intensity value for the pixel window. In this example, (i) averaging several (e.g. 2, 3 or 4) of the highest intensity values for the window pixels to select the selected high intensity value, and (ii) averaging several (e.g. 2, 3 or 4) of the lowest intensity values for the window pixels to select the selected low intensity value improves robustness with respect to noise.

In another example, the step of reviewing several of the neighboring pixels that have the highest intensity values includes the step of selecting one of a second highest intensity value, a third highest intensity value or a fourth highest intensity value to be the selected high intensity value for the pixel window; and the step of reviewing several of the neighboring pixels that have the lowest intensity values includes the step of selecting one of a second lowest intensity value, a third lowest intensity value or a fourth lowest intensity value to be the selected low intensity value for the pixel window. In this example, the performance is again improved with respect to noise.

The present invention is also directed to a method for sharpening a captured image that includes the steps of: (i) selecting a pixel in the captured image, the selected pixel including a plurality of neighboring pixels that are positioned in a predetermined pixel window; (ii) identifying an intensity value for each of the neighboring pixels; (iii) selecting a selected high intensity value for the pixel window; (iv) selecting a selected low intensity value for the pixel window; (v) sharpening the captured image to establish a sharpened intensity value for the selected pixel; (vi) determining a function value for the selected pixel based at least partly on the sharpened intensity value; and (vii) determining an adjusted intensity value for the selected pixel based at least partly on the function value and one of the selected high intensity value and the selected low intensity value. In this example, the function value can be calculated using the sharpened intensity value, and the method disclosed herein again is designed to provide different levels of overshoot control during the sharpening of different pixels.

In yet another embodiment, the present invention is a method for sharpening a captured image that includes the steps of: (i) selecting a pixel in the captured image, the selected pixel including a plurality of neighboring pixels that are positioned in a predetermined pixel window; (ii) identifying an intensity value for each of the neighboring pixels; (iii) selecting a selected high intensity value for the pixel window; (iv) selecting a selected low intensity value for the pixel window; (v) sharpening the captured image to establish a sharpened intensity value for the selected pixel; (vi) determining an original overshoot for the selected pixel; and (vii) utilizing the original overshoot to determine a transformed overshoot. In this embodiment, the method disclosed herein again is designed to provide different levels of overshoot control during the sharpening of different pixels in the captured image.

Further, in this embodiment, the step of determining an original overshoot includes the step of comparing the sharpened intensity value to at least one of the selected high intensity value and the selected low intensity value. Moreover, the step of utilizing the original overshoot can include the step of utilizing a graph that plots original overshoot versus transformed overshoot. Alternatively, the step of utilizing the original overshoot can include the step of using a look-up table that provides a one or more transformed overshoots for one or more original overshoots.

DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 11 each illustrates an alternative blurry pixel window for a selected pixel having features of the present invention; and FIGS. 12A and 12B illustrate alternative coefficient masks.

DESCRIPTION

Figure 1:
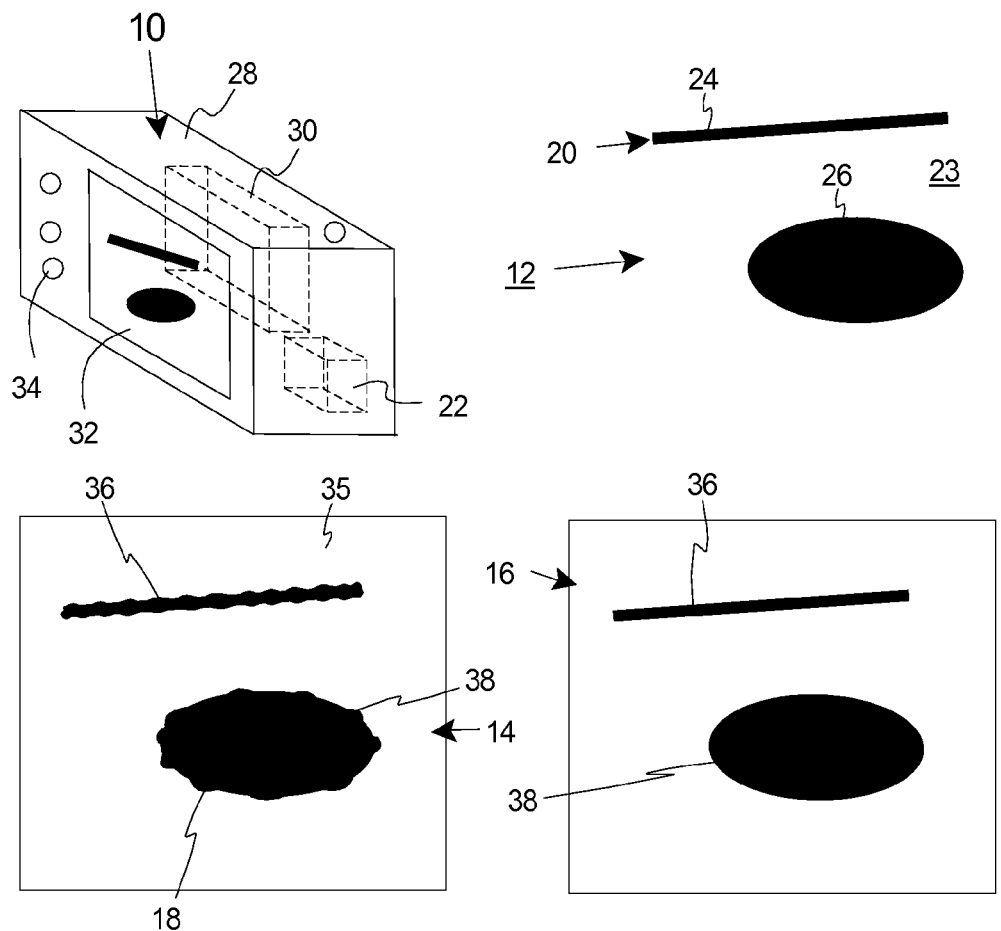
FIG. 1 is a simplified view of a scene, an image apparatus having features of the present invention, a captured image of the scene, and an adjusted image.

FIG. 1 is a simplified perspective illustration of an image apparatus 10 having features of the present invention, and a simplified illustration of a scene 12. FIG. 1 also illustrates a raw captured image 14 (illustrated away from the image apparatus 10) captured by the image apparatus 10, and an adjusted image 16 (illustrated away from the image apparatus 10) generated by the image apparatus 10. In FIG. 1, the raw captured image 14 is blurred 18 (illustrated as a wavy line). For example, movement of the image apparatus 10, and/or movement of one or more objects 20 in the scene 12 during the capturing of the image 14 can cause motion blur 18. Alternatively or additionally, for example, blur 18 in the captured image 14 can be caused by the image apparatus 10 not being properly focused when the image 14 is captured.

In one embodiment, the image apparatus 10 includes a control system 22 (illustrated as a box in phantom) that uses a unique program having adaptive overshoot control while sharpening the captured image 14 to provide the adjusted image 16. Stated in another fashion, in one embodiment, the control system 22 provides in camera sharpening of the raw image 14 to provide the more visually pleasing, sharpened adjusted image 16. Alternatively, the sharpening algorithm with overshoot control provided herein can be utilized by a computer to post-process the blurred captured images 14.

The type of scene 12 captured by the image apparatus 10 can vary. For example, the scene 12 can include one or more objects 20, e.g. animals, plants, mammals, structures, and/or environments. For simplicity, in FIG. 1, the scene 12 is illustrated as including a white background 23, a solid black, thin rectangle 24 and a solid black oval 26.

In one embodiment, the image apparatus 10 is a digital camera, and includes an apparatus frame 28, and a capturing system 30 (illustrated as a box in phantom), in addition to the control system 22. It should be noted that many of the necessary components of the image apparatus 10 have been omitted for clarity. Additionally or alternatively, the image apparatus 10 can be designed to capture a video of the scene 12.

The apparatus frame 28 can be rigid and support at least some of the other components of the image apparatus 10. In one embodiment, the apparatus frame 28 includes a generally rectangular shaped hollow body that forms a cavity that receives and retains at least some of the other components of the image apparatus 10.

The capturing system 30 captures information for the raw captured image 14. The design of the capturing system 30 can vary according to the type of image apparatus 10. For a digital type camera, the capturing system 30 can include an image sensor (not shown), and a storage system (not shown). The image sensor receives the light and converts the light into electricity. One non-exclusive example of an image sensor for digital cameras is known as a charge coupled device ("CCD"). An alternative image sensor uses complementary metal oxide semiconductor ("CMOS") technology. The storage system stores the various captured and/or adjusted images 14, 16 before these images are ultimately printed out, deleted, transferred or downloaded to an auxiliary storage system or a printer. The storage system can be fixedly or removably coupled to the apparatus frame 28. Non-exclusive examples of suitable storage systems include flash memory, a floppy disk, a hard disk, or a writeable CD or DVD.

The control system 22 is electrically connected to and controls the operation of the electrical components of the image apparatus 10. The control system 22 can include one or more processors, and the control system 22 can be programmed to perform one or more of the functions described herein. In FIG. 1, the control system 22 is secured to and is positioned within the apparatus frame 28. As provided above, the control system 22 can include software that reduces the level of blur 18 in the blurred captured image 14 to provide the sharpened adjusted image 16.

The image apparatus 10 can include an image display 32 that displays the captured images 14, the adjusted images 16, and/or other information that can be used to control the functions of the image apparatus 10. With this design, the user can decide which images 14, 16 should be stored and which images 14, 16 should be deleted. In FIG. 1, the image display 32 is fixedly mounted to the rest of the image apparatus 10. Alternatively, the image display 32 can be secured with a hinge mounting system (not shown) that enables the display 32 to be pivoted.

Moreover, the image apparatus 10 can include one or more control switches 34 electrically connected to the control system 22 that allows the user to control the functions of the image apparatus 10. For example, one or more of the control switches 34 can be used to selectively switch the image apparatus 10 to activate the sharpening and blur reduction processes disclosed herein.

In FIG. 1, the captured image 14 and the adjusted image 16 each includes (i) a background image part 35 that represents the captured background 23 of the scene 12, (ii) a rectangle image part 36 that represents the captured rectangle 24 of the scene 12, and (iii) an oval image part 38 that represents the captured oval 26 of the scene 12. In FIG. 1, the edges of the rectangle image part 36 and the edges of the oval image part 38 of the captured image 14 are blurred 18. Further, the control system 22 sharpens the captured image 14 to provide the adjusted image 16 that has sharper edges of the rectangle image part 36 and shaper edges of the oval image part 38.

Figure 2:
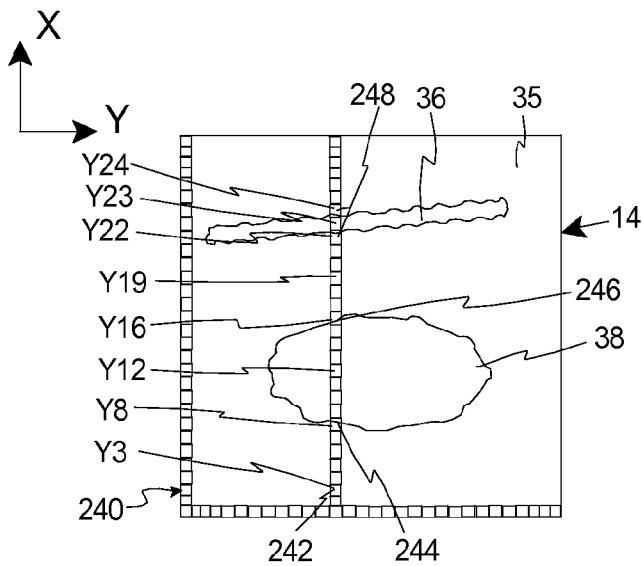
FIG. 2 is a simplified view of the captured image of FIG. 1.

FIG. 2 illustrates the captured image 14 of FIG. 1, including the background image part 35, the rectangle image part 36, and the oval image part 38. However, in FIG. 2, the rectangle image part 36 and the oval image part 38 are illustrated in line format instead of as solid objects for clarity of illustration. Additionally, FIG. 2 illustrates that the captured image 14 is comprised of a plurality of pixels 240 (only a few representative pixels are illustrated in FIG. 2). This Figure also includes a two-dimensional orientation system that illustrates an X axis, and a Y axis for the captured image 14. In this example, each of the pixels 240 is labeled relative to this coordinate system. For example, the bottom left corner pixel can be identified as (X1, Y1) that represents the pixel in the first column and the first row. Further, in this example, the captured image 14 is illustrated as a thirty by thirty pixel array for simplicity. However, a typical captured image 14 will be comprised of millions of pixels.

As provided herein, the pixels 240 of the captured image 14 can be characterized based on the texture of the areas that they capture. For example, the captured image 14 can include (i) one or more scene smooth regions, e.g. areas which have a substantially constant color (color homogenous regions); and/or (ii) one or more scene edge regions, e.g. areas which are in the transition between objects, lines, and color changes. In this embodiment, the pixels 240 that are part of the smooth regions of the captured image 14 can be labeled as non-edge pixels 242; and the pixels that are part of the edge regions can be labeled as edge pixels 244. As provided herein, the term edge pixel 244 is defined as those pixels on or within a prescribed distance of (e.g., up to 5 or 10 pixels away) an edge captured in the image 14.

In FIG. 2, (i) some of the pixels 240 that have captured the background 23 (illustrated in FIG. 1), and some of the pixels 240 that have captured the oval 26 (illustrated in FIG. 1) are non-edge pixels 242; and (ii) the pixels 240 that have captured the transition between the background 23 and the rectangle 24, and the pixels 240 that have captured the transition between the background 23 and the oval 26 are edge pixels 244.

As an example, in column 13, (X13) of FIG. 2 (i) the pixel at row 3 (Y3) is a non-edge pixel 242 that has captured a portion of the background 23; (ii) the pixel at row 8 (Y8) is an edge pixel 244 that has captured a portion of the edge between the background 23 and the oval 26; (iii) the pixel at row 12 (Y12) is a non-edge pixel 242 that has captured a portion of the oval 26; (iv) the pixel at row 16 (Y16) is an edge pixel 244 that has captured a portion of the edge between the background 23 and the oval 26; (v) the pixel at row 19 (Y19) is a non-edge pixel 242 that has captured a portion of the background 23; (vi) the pixel at row 22 (Y22) is an edge pixel 244 that has captured a portion of the edge between the background 23 and the rectangle 24; and (vii) the pixel at row 24 (Y24) is an edge pixel 244 that has captured a portion of the edge between the background 23 and the rectangle 24.

As an overview, in certain embodiments, the present invention teaches that different levels of overshoot control is necessary during the sharpening of different pixels 240. Stated in another fashion, different pixels in a blurred image need different type of overshoot control and strong overshoots are needed to properly restore local contrast in areas of an image that contain lines or other fine features. The area where strong overshoot control is not desirable is the area between such line edges.

As provided herein, in certain embodiments, the present invention classifies each of the pixels 240 in the captured image 14 as either a non-line pixel 246 or a line pixel 248. In one embodiment, (i) edge pixels 244 that are part of a line-like edge in the captured image 14 are considered line pixels 248, and (ii) the remaining pixels in the captured image 14 are considered non-line pixels 246. In this example, non-line pixels 246 include (i) edge pixels 244 that are part of a step-like edge between two objects, and (ii) pixels that are not classified as edge pixels 244 (e.g. smooth, non-edge pixels 242). With this design, the non-line pixels 246 require a relatively high, first level of overshoot control to reduce halos in the adjusted image 16, and the line pixels 248 (that capture the lines and other fine features) require a relatively low, second level of overshoot control to allow significant overshoots in the area between these close pairs of edge pixels and reduce the painterly appearance of the adjusted image.

Figure 3A:
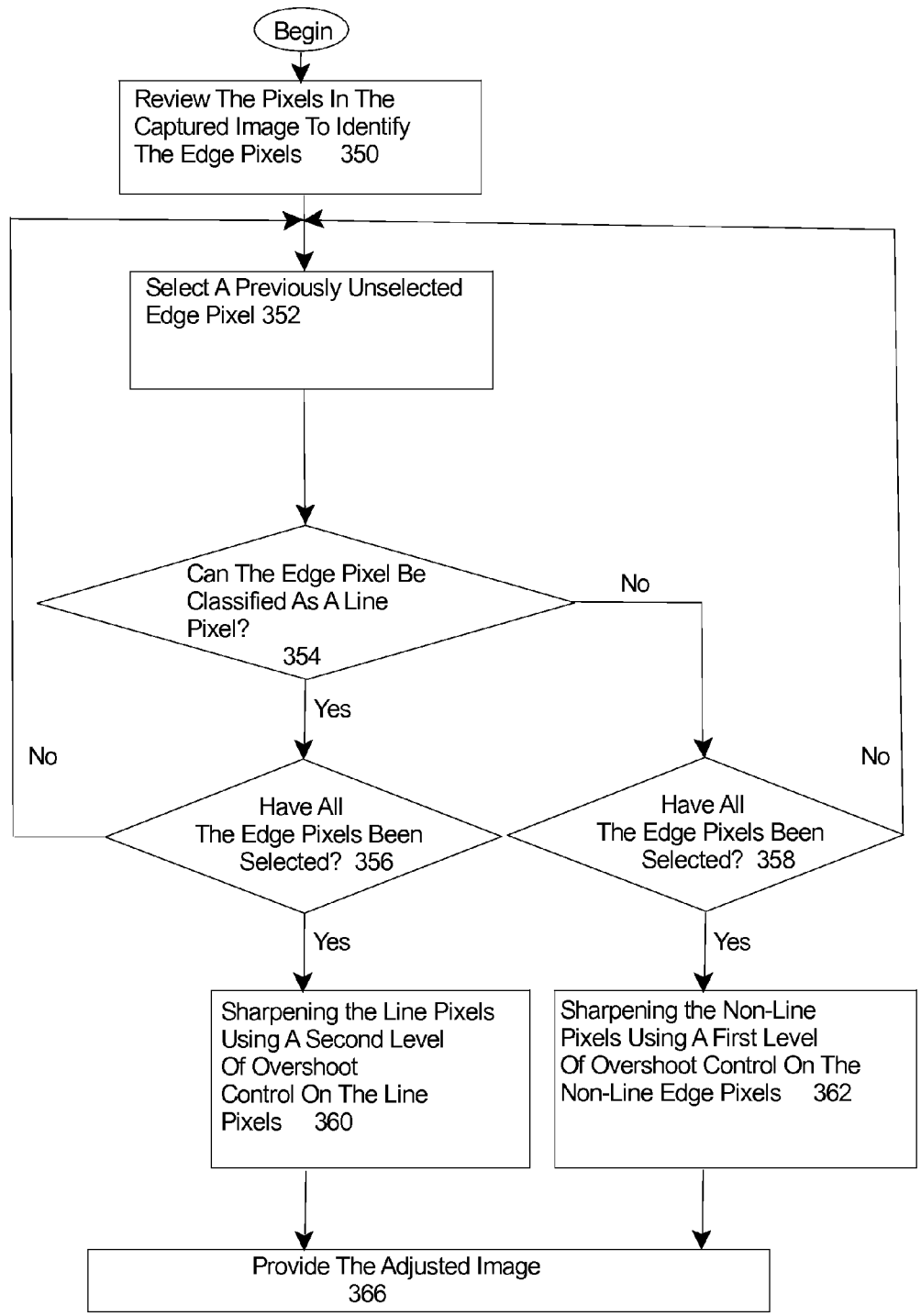
FIG. 3A is a flow chart that illustrates one embodiment of a sharpening method having features of the present invention.

FIG. 3A is a flow chart that illustrates one non-exclusive embodiment of the steps performed by the control system 22 (illustrated in FIG. 1) to sharpen the captured image 14 (illustrated in FIG. 2). Typically, the haloing effect primarily influences the non-edge pixels 242 that are next to the edge pixels 244. Accordingly, at step 350, the control system 22 reviews all of the pixels 240 of the captured image 14 and identifies all of the edge pixels 244 in the captured image 14.

Figure 3B:
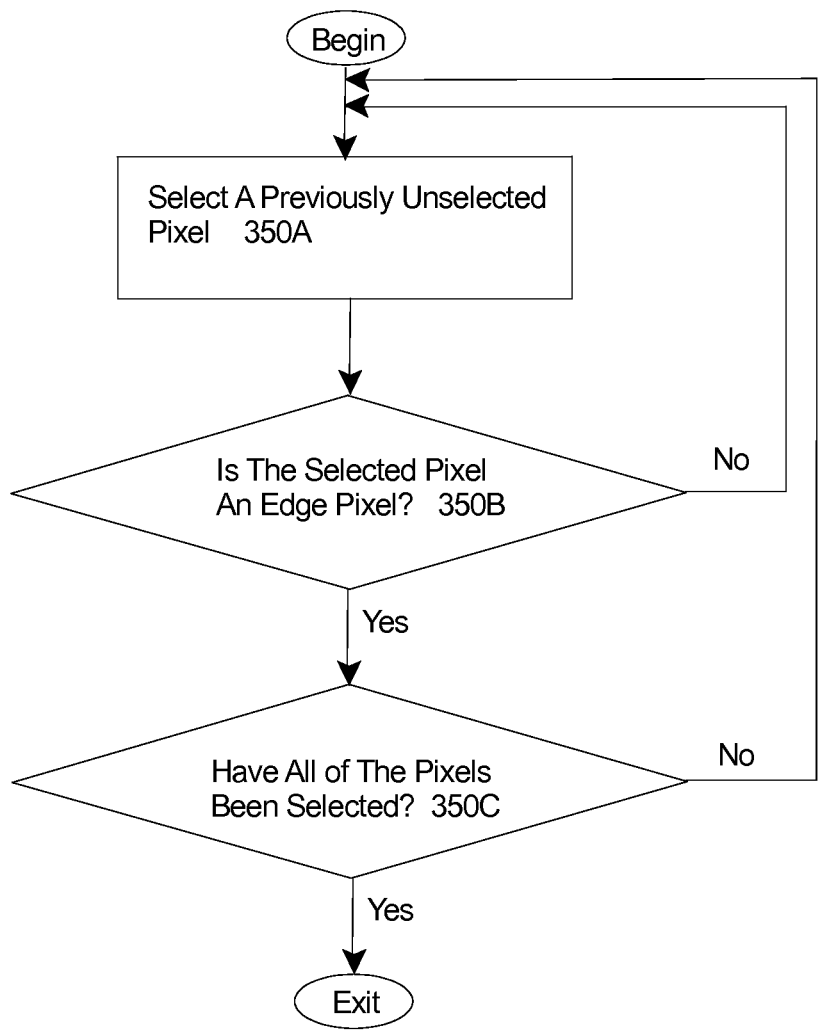
FIG. 3B is a flow chart that illustrates a portion of the sharpening method having features of the present invention.

FIG. 3B is a flow chart that illustrates one non-exclusive embodiment of the steps performed by the control system 22 (illustrated in FIG. 1) to identify the edge pixels and the non-edge pixels. Basically, an edge detection algorithm is utilized to detect strong edges.

In FIG. 3B, (i) at step 350A, the control system 22 selects a previously unselected pixel in the captured image 14; (ii) subsequently, at step 350B, the control system 22 determines if the selected pixel is an edge pixel; and (iii) next, at step 350C, the control system 22 repeats this process until all of the pixels in the captured image 14 have been selected. In this embodiment, the edge detection is performed at the pixel level and each of the pixels 240 of the captured image 14 is evaluated. There are a number of different, commonly known methods that can be used to identify the edge pixels 244 in a captured image. Most methods are based on the fact that the first derivative in the direction perpendicular to the edge direction is high at the location of the edge.

Referring back to FIG. 3A, after the edge pixels and non-edge pixels have been identified, the control system evaluates the edge pixels to determine which of the edge pixels are classified as line pixels. The remaining pixels in the captured image are classified as non-line pixels. For example, at step 352, the control system selects a previously unselected edge pixel. Subsequently, at step 354, the control system evaluates the selected edge pixel to determine if the selected edge pixel can be classified as a line pixel. If the selected edge pixel is not classified as a line pixel, then the selected edge pixel is classified as a non-line pixel. With the present invention, the line pixels depict thin lines and other fine features of a different shape are detected and handled differently from the other pixels during sharpening of the image.

One, non-exclusive method that can be used to identify edge pixels that are line pixels includes evaluating all of the edge pixels to identify pairs of edge pixels (e.g. opposite edges of the line) which are close to each other, that have gradients that point in the opposite direction from each other, and are approximately parallel. These pixels are classified as line pixels. Further, it should be noted that these close edge pixels, as well as all pixels between those pairs of edge pixels are considered a part of the line and are considered line pixels. Stated in another fashion, both the edge pixels forming the pair and all the pixels that are between them are part of the line and are considered line pixels. As provided herein, the pixels in the middle of the fine lines and small features are not edge pixels, yet they require strong sharpening to restore the contrast lost by blurring.

As used herein, in alternative, non-exclusive embodiments, the phrase "close to each other" will depend upon the number of pixels in the captured image. For example, "close to each other" can mean adjacent to each other or within approximately 1, 2, or 3 pixels of each other. However, the meaning can be adjusted to suit the number of pixels in the image.

In certain embodiments, lines that are darker than the background (hereinafter "darker lines") can be distinguished from the lines that are lighter (hereinafter "lighter lines") than the background. In one embodiment, the algorithm disclosed herein distinguishes between darker lines and lighter lines by evaluating the direction of the gradient vectors for the close pairs of edge pixels. More specifically, the algorithm classifies the line as (i) a darker line when the gradient vectors for the close pairs of edge pixels point away from each other; or (ii) a lighter line when the gradient vectors for the close pairs of edge pixels point towards each other. Keeping the track of darker and lighter lines separately can be useful for not allowing overshoots along the sides of lines and for making seamless transitions between areas with strong and weak overshoot control as discuss further below.

Referring back to FIG. 2, in column 13 (X13), the pixel in row 22 (Y22) and the pixel in row 24 (Y24) are at opposed edges of the rectangle, with opposite orientation and are close together (e.g. separated by only one pixel). In this example, the control system can classify pixels (X13, Y22) and (X13, Y24) as line pixels. It should be noted that in this example, if there were any pixels between the line pixels (X13, Y22) and (X13, Y24) in column 13, they would also be classified as line pixels. More specifically, in this example, pixel (X13, Y23) would also be classified as a line pixel.

In contrast, in column 13, (X13), the pixel in row 8 (Y8) and the pixel in row 16 (Y16) are at opposed edges of the oval 38 but are relatively far apart (e.g. eight pixels apart in a thirty pixel grid). In this example, the control system can classify pixels (X13, Y8) and (X13, Y16) as non-line pixels.

The process classifying the edge pixels is repeated at steps 356 and 358 until all of the pixels have been identified as either (i) a line pixel, or (ii) a non-line pixel. It should be noted that the non-line pixels can be determined by subtracting the line pixels from the captured image. After all pixels have been classified, the control system (i) at step 360 can sharpen the line pixels using a second level of overshoot control, and (ii) at step 362 can sharpen the non-line pixels (e.g. all the pixels that are not line pixels) using a first level of overshoot control. Subsequently, at step 366, the control system can provided the adjusted image from the sharpened pixels.

Figure 4A:
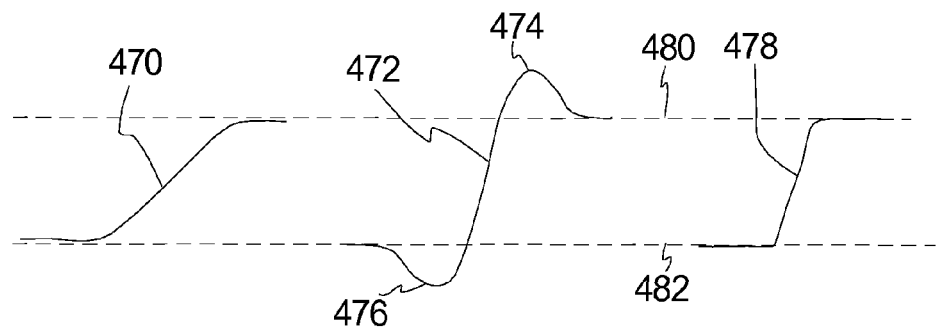
FIG. 4A is a graph that illustrates a portion of a first edge area of the captured image.

The sharpening of the non-line pixels can better be understood with reference to FIG. 4A. In this Figure, profile 470 represents a blurred individual step-like edge that is made up of a plurality of non-line edge pixels. Because the edge is blurred, the slope of curve 470 is not very steep.

Further, in FIG. 4A, the profile 472 represents the sharpened edge profile that results from sharpening the pixels of profile 470. For example, a conventional sharpening operation involves enhancing the high-frequency components of a signal, which represents an image in this case. There are many sharpening schemes currently in existence, most of which result in the previously-described halo effect. One such sharpening algorithm is called the unsharp mask. In this type of operation, an approximation of the blurred portion of the edge is extracted using a low-pass filter. Subsequently, the original and blurred versions of the edge are compared to obtain the high frequency signal. Next, the high frequency signal multiplied by a gain factor greater than one is added back to the original edge to generate the resulting sharpened edge profile 472. It should be noted that the resulted sharpened profile 472 includes an upper overshoot 474 and a lower overshoot 476 that cause the halo effect in the resulting sharpened image.

Finally, profile 478 represents a sharpened edge that results after sharpening and with overshoot control. In this example, the overshoots 474, 476 have been approximately completely suppressed with the first level of overshoot control. As a result thereof, the pixels classified as non-line pixels are sharpened without visible bright and dark halos.

There are a number of overshoot controls that can be applied to the non-line pixels as the first level of overshoot control. For example, the first level overshoot control for each edge pixel can control the overshoot by determining a selected high intensity value 480 (illustrated as a dashed line) and a selected low intensity value 482 (illustrated as a dashed line) for each edge pixel. Subsequently, the sharpened intensity value of the edge pixel can be truncated based on these selected high and low intensity values. This method for overshoot control can be referred to as the complete clipping overshoot control.

In non-exclusive embodiment, for each pixel, (i) the selected high intensity value 480 is equal to the maximum intensity of the neighboring pixels within a predetermined, local pixel window of each edge pixel prior to sharpening, and (ii) the selected low intensity value 482 is equal to the minimum intensity of the neighboring pixels within a predetermined, local pixel window of each edge pixel prior to sharpening.

In this type of overshoot control, before sharpening each edge pixel, the intensity values of the neighboring pixels in the pixel window for each edge pixel in the blurred image are evaluated. Next, the minimum intensity and maximum intensity within a window of certain size surrounding each edge pixel is computed, because, in this example, the selected high intensity value is equal to the maximum intensity in the pixel window, and the selected low intensity value is equal to the minimum intensity in the pixel window.

Subsequently, for each pixel in the sharpened image, the calculated sharpened intensity value is compared to the selected high intensity value and the selected low intensity value, and if the sharpened intensity value is smaller than the selected low intensity value, or larger than the selected high intensity value, the sharpened intensity value is adjusted to provide an adjusted intensity value.

With complete clipping overshoot control, the new intensity value at each pixel is set to the be equal to (ii) the selected high intensity value in the event the sharpened intensity value is greater than the selected high intensity value, or (ii) the selected low intensity value in the event the sharpened intensity value is less than the selected low intensity value. For example, this type of overshoot control for edge pixel (i,j) can be expressed in the following two equations:

$$p_{new}(i,j)=H(i,j), \text{ if } p_s(i,j)>H(i,j) \qquad \text{Equation 1}$$

and $$p_{new}(i,j)=L(i,j), \text{ if } p_s(i,j)<L(i,j). \qquad \text{Equation 2}$$

In the Equations provided herein, (i) $p_s(i,j)$ represents the calculated sharpened intensity value at pixel (i,j); (ii) $H(i,j)$ represents the selected high (maximum) intensity value for the pixels in the window that surrounds edge pixel (i,j); (iii) $L(i,j)$ represents the selected low (minimum) intensity value for the pixels in the window that surrounds pixel (i,j); and $p_{new}(i,j)$ represents the new (adjusted) intensity value that is assigned to the pixel (i,j) in the event the calculated sharpened intensity value $p_s(i,j)$ is greater than the selected high intensity value $H(i,j)$ or less than the selected low intensity value $L(i,j)$.

In an alternative embodiment, the first overshoot control can include some form of partial clipping based on the selected high and low intensity values. This overshoot control is referred to as the partial clipping overshoot control. In this embodiment, the new intensity value at edge pixel (i,j) is set to the be equal to (i) the selected high intensity value plus a predetermined constant ("C") in the event the sharpened intensity value greater than the selected high intensity value plus the predetermined constant, or (ii) the selected low intensity value minus the predetermined constant in the event the sharpened intensity value is less than the selected low intensity value minus the predetermined constant. This type of overshoot control is expressed in following equations 3 and 4:

$$p_{new}(i,j)=H(i,j)+C, \text{ if } p_s(i,j)>H(i,j)+C \qquad \text{Equation 3}$$

and $$p_{new}(i,j)=L(i,j)-C, \text{ if } p_s(i,j)<L(i,j)-C \qquad \text{Equation 4}$$

In Equations 3 and 4, C is the pre-determined constant that has a value that is greater than or equal to zero ($C \geq 0$). The value of the pre-determined constant C can be selected to achieve the desired level of overshoot control. In certain embodiments, the actual value of the pre-determined constant C will depend on the range of values used for representing an image (i.e., image scaling). For example, if the scale 0 to 255 is used for the intensity channel Y, and the maximum size of overshoot for strong overshoot control can be around 5, while for weak overshoot control can be around 50. However, these values can be varied considerably. Alternatively, if the image is scaled so as the values are between 0 and 1, or between 0 and 65535 (16-bit data), or 0 and 4095 (12-bit RAW data), or 0 and 16383 (14-bit RAW data), then the pre-determined constant C has to be re-scaled appropriately.

In yet another alternative embodiment, the first overshoot control can include some form of linear scaling of overshoots by a predetermined factor. This overshoot control is referred to as scaling overshoot control. In this embodiment, the new intensity value at pixel (i,j) is set to the be equal to (i) the selected high intensity value plus a predetermined factor ("k") multiplied by the sharpened intensity value minus the selected high intensity value, if the sharpened intensity value is greater than the selected high intensity value, or (ii) the selected low intensity value minus the predetermined factor multiplied by the selected low intensity value minus the sharpened intensity value, if the sharpened intensity value is less than the selected low intensity value. This type of overshoot control is expressed in following equations 5 and 6:

$$p_{new}(i,j)=H(i,j)+k \times (p_s(i,j)-H(i,j)), \text{ if } p_s(i,j)>H(i,j) \qquad \text{Equation 5}$$

and $$p_{new}(i,j)=L(i,j)-k \times (L(i,j)-p_s(i,j)), \text{ if } p_s(i,j)<L(i,j) \qquad \text{Equation 6}$$

In Equations 5 and 6, k is the predetermined factor that has a value that is between approximately zero and one ($0 \leq k \leq 1$).

Figure 4B:
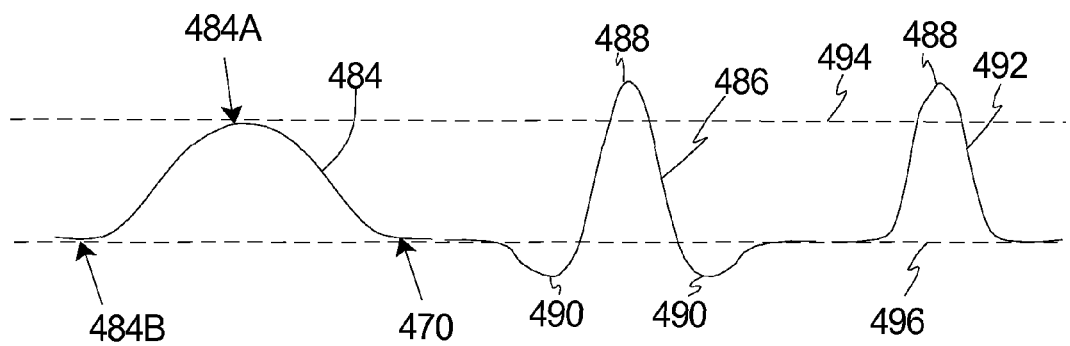
FIG. 4B is a graph that illustrates a portion of a second edge area of the captured image.

In contrast, the sharpening of the line pixels can better be understood with reference to FIG. 4B. In this Figure, profile 484 represents a plurality of blurred line pixels that depict a thin line or another fine feature in the captured image. In this example, the plurality of blurred line pixels are located in the area designated 484A near the upper center of the profile 484, and the plurality of non-line pixels are in the areas designated 484B near the lower sides of the profile 484. Alternatively, depending upon the contents of the captured image, profile can be inverted with the plurality of line pixels having lower intensities than the non-line pixels.

Further, in FIG. 4B, the profile 486 represents the sharpened edge profile that results from sharpening the unsharp profile 484. For example, the sharpening algorithm called the unsharp mask can be utilized. It should be noted that the resulting sharpened profile 486 includes (i) an upper overshoot 488 caused by sharpening the line pixels, and (ii) a pair of lower overshoots 490 caused by sharpening the non-line pixels. As provided herein, the overshoots 490 that result from sharpening the non-line pixels cause a halo effect in the resulting sharpened image. Alternatively, as disclosed herein, the overshoot 488 that results from sharpening the line pixels (e.g. the lines and small features) is desirable and necessary to avoid the resulting sharpened image from looking painterly. Stated in another fashion, the overshoot 488 in the middle of the line is desirable to reverse the loss of contrast caused by blurring, while the overshoots 490 along the sides of the line are undesirable, as they represent halos that are normally not present around a sharp line. Thus, to restore the lost contrast, the overshoot 488 in the middle must be preserved and only the overshoots 490 at the sides need to be suppressed to prevent halos around the line. Thus, as provided herein, the first level of overshoot control is applied to all non-line pixels and the second level of overshoot control is applied to the line pixels.

Finally, profile 492 represents a sharpened edge that results after sharpening, with the first level of overshoot control applied to the non-line pixels and the second level of overshoot control is applied to the line pixels. In this example, the lower overshoots 490 have been approximately completely suppressed with the first level of overshoot control, and there is still a large upper overshoot 488 because the second level of overshoot control is applied to the line pixels.

In this example, there are a number of overshoot controls that can be applied to all of the non-line pixels as the first level of overshoot control. For example, the first level overshoot control can be the complete clipping overshoot control. In FIG. 4B, the maximum window intensity value is illustrated as dashed line 494, and the minimum window intensity value is illustrated as dashed line 496. Alternatively, the first level overshoot control can be (i) the partial clipping overshoot control with a relatively small predetermined constant, (ii) the linear scaling overshoot control with a relatively small predetermined factor, or (iii) the more sophisticated overshoot control described below in reference to FIG. 10.

In contrast, for example, the second level of overshoot control can be approximately (i) no overshoot control, (ii) partial clipping overshoot control with a relatively large predetermined constant, (iii) linear scaling overshoot control with a predetermined factor that is greater than or equal to one, or (iv) the more sophisticated overshoot control described below in reference to FIG. 10. While it is possible to switch the overshoot control off completely in the areas of line pixels, it can be beneficial to use some overshoot control there, only with much higher limit on maximal allowed overshoot size. This helps to reduce some artifacts caused by magnification of noise and to prevent oversharpening of small, high contrast features when strong sharpening is applied.

As non-exclusive examples, with the partial clipping overshoot control for both the first and second levels of overshoot control, the value for the predetermined constant C for the second level of overshoot control can have a value that is approximately 5, 10, 15, or 20 times greater than the value of the predetermined constant C for the first level of overshoot control. In contrast, when constant C is chosen to be identical for all pixels of an image, the results are not very good. So as to sufficiently suppress bright and dark halos around non-line pixels, C needs to be quite small. However, if C is small, the areas of image that contain small features and texture (e.g. the close pairs of edge pixels) are rendered poorly (e.g. they become too flat and posterized), and the resulting image looks unnatural (more like a painting than a photograph).

As additional non-exclusive examples, with linear scaling overshoot control for both the first and second levels of overshoot control, the value for the predetermined factor K for the second level of overshoot control is greater than the predetermined factor K for the first level of overshoot control.

In summary, in one embodiment, the present invention proposes to detect in the captured image all line pixels and either to use no overshoot control at all for the line pixels or to use significantly weaker overshoot control there than in the other areas (with much higher limit on the maximal allowed size of an overshoot). When this method is used, the contrast of various small features and textures in images also gets properly restored when an image is sharpened and more natural look of these areas is thus achieved, while unpleasant visible halos in the non-line pixels are successfully suppressed.

The present invention is also directed to a couple of alternative methods for computing the bounds (e.g. the selected high intensity value $H(i,j)$, and the selected low intensity value $L(i,j)$) that are used for the first level and/or the second level of overshoot control, which is more robust to noise and improves performance.

In one embodiment, instead of the maximum intensity value used as the selected high intensity value and the minimum intensity value used as the selected low intensity value, for each pixel, the present invention proposes reviewing several of the neighboring pixels that have the highest intensity values to determine the selected high intensity value, and reviewing several of the neighboring pixels that have the lowest intensity values to determine a selected low intensity value. In this embodiment, the present invention provides that (i) the selected high intensity value $H(i,j)$ is determined by averaging several (e.g. 2, 3, 4, or 5) of the highest intensity values for the neighboring pixels, and (ii) the selected low intensity value $L(i,j)$ is determined by averaging several (e.g. 2, 3, 4 or 5) of the lowest intensity values for the neighboring pixels.

Figure 5A:
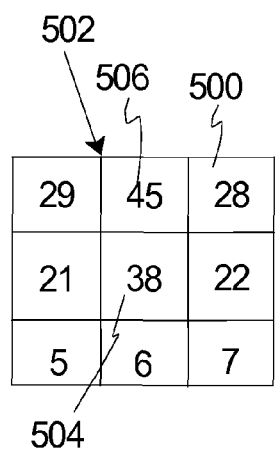
FIG. 5A illustrates a blurry pixel window for a selected pixel having features of the present invention.

FIG. 5A illustrates an intensity value for a plurality of neighboring pixels 500 that define a pre-determined pixel window 502 that surrounds and encircles a selected pixel (i,j) 504 (at the center of the three by three grid) of the blurred image. The size and shape of the pixel window 502A used can be varied to achieve the desired performance characteristics. In FIG. 5A, each pixel window 502 is illustrated as including nine pixels (e.g. the selected pixel 504 and eight neighboring pixels 500). Alternatively, the pixel window 502 can be larger or smaller than nine pixels or have as shape other than square.

The selected high intensity value $H(i,j)$ and the selected low intensity value $L(i,j)$ for pixel (i,j) 504 are computed from the pre-determined pixel window 502 of the blurry image. In one example, (i) the selected high intensity value $H(i,j)$ is determined by averaging the three highest intensity values for the pixels in the pre-determined pixel window 502, and (ii) the selected low intensity value $L(i,j)$ is determined by averaging the three lowest intensity values for the pixels in the pre-determined pixel window 502. In this example, the (i) the selected high intensity value $H(i,j)=(45+38+28)/3=37$, and (ii) the selected low intensity value $L(i,j)=(5+6+7)/3=6$. It should be noted that the value of the selected pixel (i,j) is included in the computations because it is the part of the pre-determined pixel window 502.

Figure 5B:
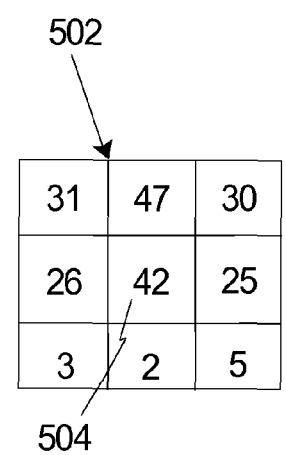
FIG. 5B illustrates a sharpened pixel window for the selected pixel having features of the present invention.

FIG. 5B illustrates a sharpened intensity value for the pixels in the pre-determined pixel window 502 including the selected pixel (i,j) 504. In this example, the calculated sharpened intensity value $p_s(i,j)$ for the selected pixel 504 is forty-two (42). Because, the sharpened intensity value $p_s(i,j)$ is greater than the selected high intensity value $H(i,j)$ (42>37), there is an overshoot and it is a brighter overshoot. Thus, the sharpened intensity value $p_s(i,j)$ may get reduced. More specifically, as provided herein, if and how much the sharpened intensity value $p_s(i,j)$ will get reduced depends upon (i) the type of overshoot control utilized, and (ii) whether the pixel is a line pixel or a non-line pixel (i.e., whether the weak, strong, or a blend of weak and strong overshoot control is going to be applied).

As a simple example, partial clipping type overshoot control is used and the overshoots are not clipped off completely. In this simple example, the strong overshoot control can be designed to clip off all overshoots bigger than 3 brightness levels, while the weak overshoot control can be designed to clip all overshoots bigger than 60 brightness levels. That is can be expressed as (i) $f_{strongOSC}(x)=x$, if $x \leq 3$ and $f_{strongOSC}(x)=3$, if $x>3$; and (ii) $f_{weakOSC}(x)=x$, if $x \leq 60$ and $f_{weakOSC}(x)=60$, if $x>60$. Where $f_{strongOSC}(x)$ represents strong overshoot control and $f_{weakOSC}(x)$ represents weak overshoot control.

If the selected pixel (i,j) 504 is a line pixel, then the weak overshoot control is applied. The size of the overshoot is 42−37=5 which is less than 60, so the overshoot will not get clipped and the resulting new (adjusted) intensity value $p_{new}(i,j)$ is equal to sharpened intensity value $p_s(i,j)$ (e.g. $p_{new}(i,j)=p_s(i,j)=42$). This can be expressed as $p_{new}(i,j)=H(i,j)+f_{weakOSC}(p_s(i,j)-H(i,j))=37+f_{weakOSC}(5)=37+5=42$.

Alternatively, if the selected pixel (i,j) 504 is a non-line pixel, then the strong overshoot control is applied. The size of the overshoot is 42−37=5 which is more than 3, so the overshoot will get clipped to 3 brightness levels and the resulting new (adjusted) intensity value $p_{new}(i,j)$ is equal to forty. This can be expressed as $p_{new}(i,j)=H(i,j)+f_{strongOSC}(p_s(i,j)-H(i,j))=37+f_{strongOSC}(5)=37+3=40$.

Figure 6:
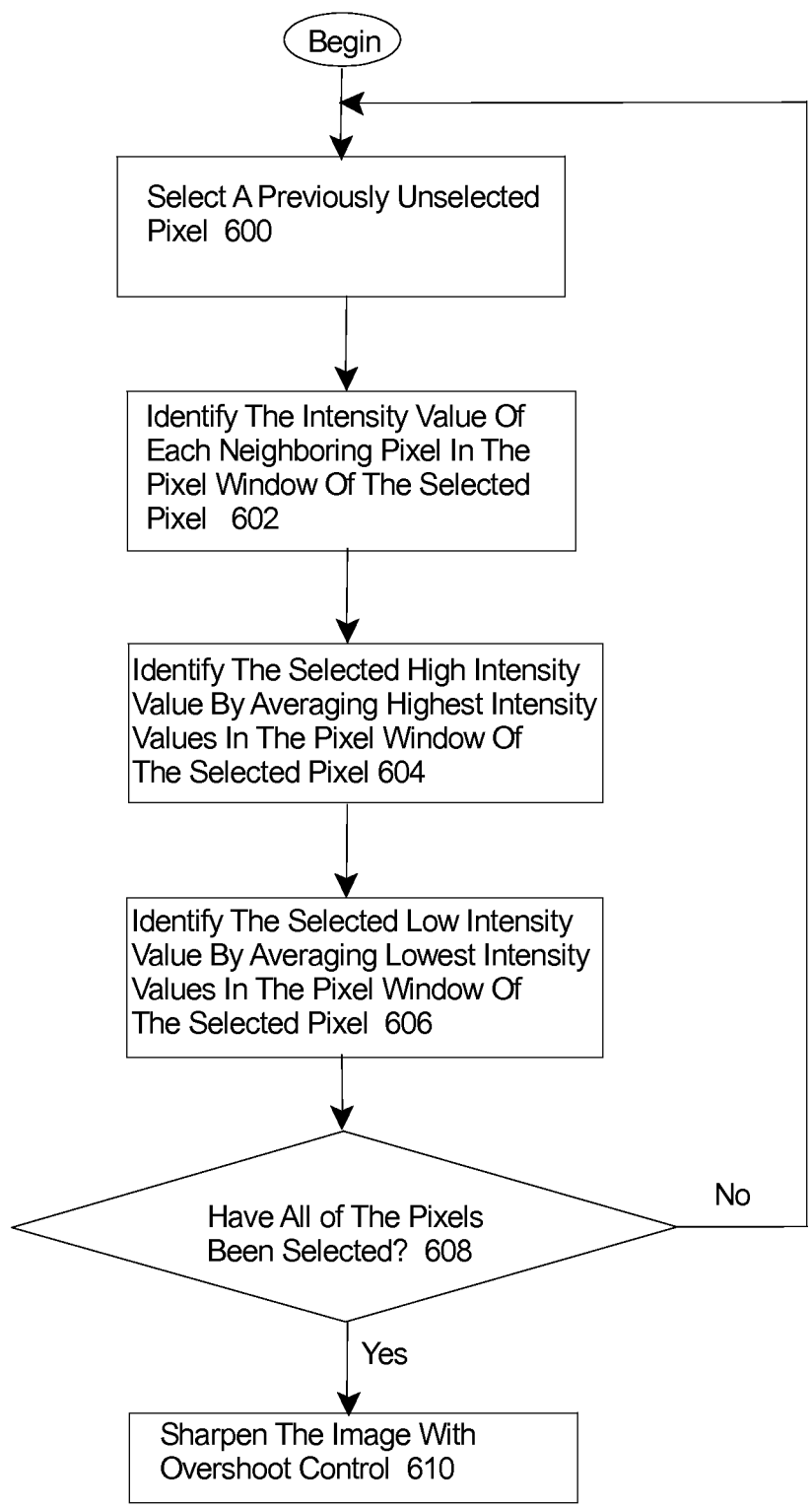
FIG. 6 is a flow chart that illustrates one embodiment of a method for determining high and low intensity values for a pixel window.

FIG. 6 is a flow chart that illustrates the calculation of the selected high intensity value and selected low intensity value using the average of the several of the intensity values. More specifically, at step 600, a previously unselected pixel is selected. Next, at step 602, an intensity value of each pixel in the pixel window is identified. Subsequently, at step 604, the selected high intensity value is determined by averaging several of the highest intensity values, and at step 606 the selected low intensity value is determined by averaging several of the lowest intensity values. At step 608, it is determined if all of the edge pixels have been selected. Finally, after all of the pixels are selected, at step 610, the captured image is sharpened with some form of overshoot control.

In another embodiment, instead of the maximum intensity value used as the selected high intensity value and the minimum intensity value used as the selected low intensity value, for each edge pixel, the present invention alternatively proposes reviewing a n-th highest intensity value to determine the selected high intensity value, and reviewing a n-th lowest intensity value to determine a selected low intensity value.

In this embodiment, for example, the present invention provides that (i) the selected high intensity value is determined by selecting one of the second, the third, the fourth, or the fifth highest intensity value for the neighboring pixels, and (ii) the selected low intensity value is determined by selecting one of the second, the third, the fourth, or the fifth lowest intensity values for the neighboring pixels.

Figure 7:
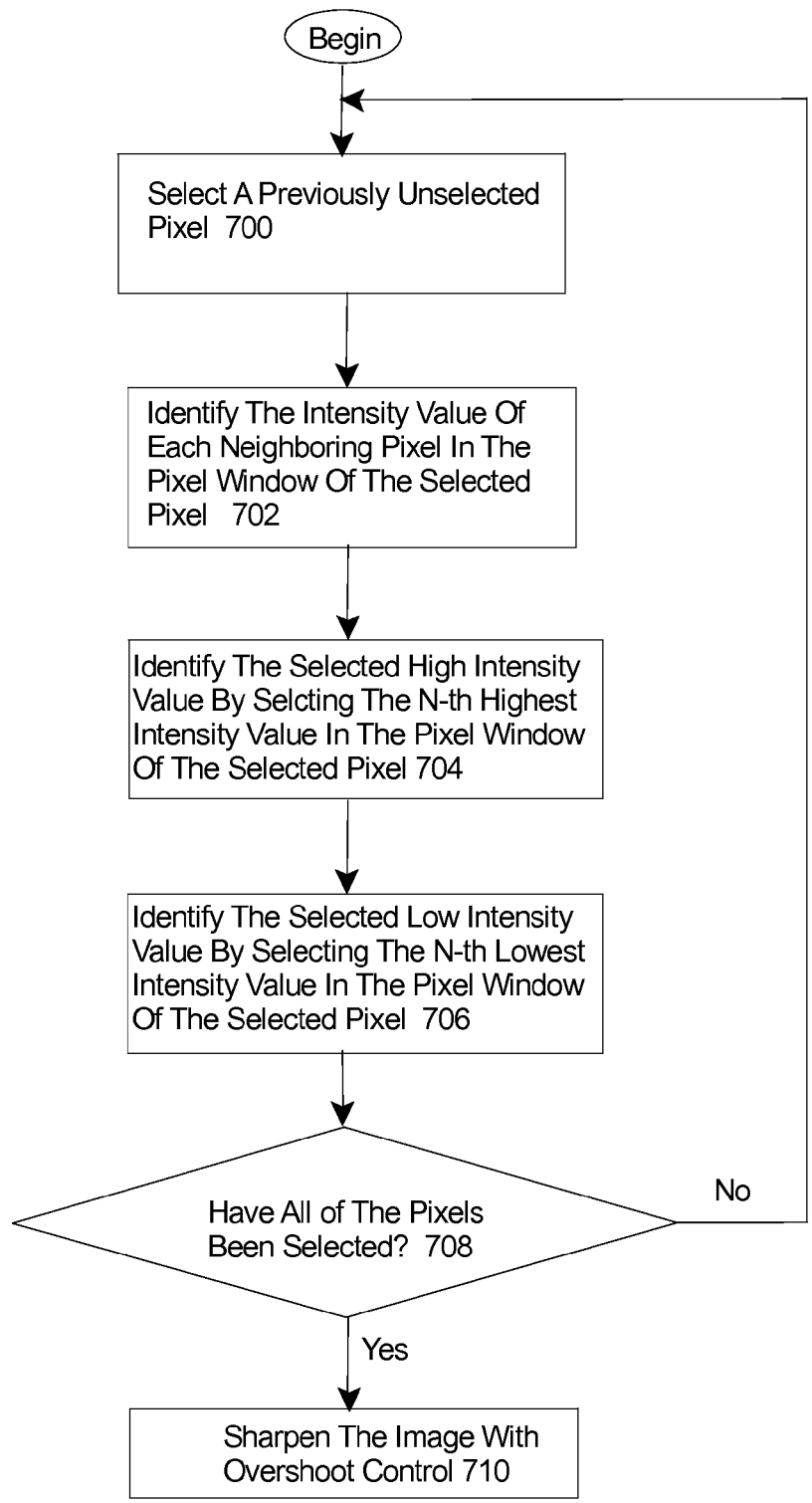
FIG. 7 is a flow chart that illustrates another embodiment of a method for determining high and low intensity values for a pixel window.

FIG. 7 is a flow chart that illustrates calculation of the selected high intensity value and selected low intensity value using the n-th highest or n-th lowest intensity values. More specifically, at step 700, a previously unselected pixel is selected. Next, at step 702, an intensity value of each neighboring pixel in the pixel window is identified. Subsequently, at step 704, the selected high intensity value is determined by selecting the n-th highest intensity value; and at step 706, the selected low intensity value is determined by selecting the n-th lowest intensity value. At step 708, it is determined if all of the edge pixels have been selected. Finally, after all of the pixels are selected, at step 710, the captured image is sharpened using some form of overshoot control.

It should be noted that for each pixel, the selected high intensity value and the selected low intensity value determined using the average or the n-th highest or lowest can be used to truncate the sharpened intensity value of the pixel using any of the overshoot controls detailed herein.

The present invention also provides another way to perform overshoot control utilizing the selected high intensity value and the selected low intensity value. In this alternative embodiment, the overshoot control utilizes a function to further define the reduced overshoot size. This overshoot control is referred to as the function overshoot control. In one embodiment, the new intensity value at each pixel is set to be equal to (i) the selected high intensity value plus the function multiplied by the sharpened intensity value minus the selected high intensity value, in the event the sharpened intensity value greater than the selected high intensity value, or (ii) the selected low intensity value minus the function multiplied by the selected low intensity value minus the sharpened intensity value in the event the sharpened intensity value is less than the selected low intensity value. This type of overshoot control is expressed in following equations 7 and 8:

$$p_{new}(i,j)=H(i,j)+f(p(i,j)-H(i,j)), \text{ if } p(i,j)>H(i,j),\qquad \text{Equation 7}$$

$$p_{new}(i,j)=L(i,j)-f(L(i,j)-p(i,j)), \text{ if } p(i,j)<L(i,j),\qquad \text{Equation 8}$$

where f is some suitable chosen function. In this design, each of the pixels can have a different chosen function. As a result thereof, the overshoot control is adaptive. Examples of possible functions are described in more detail below.

Figure 8A:
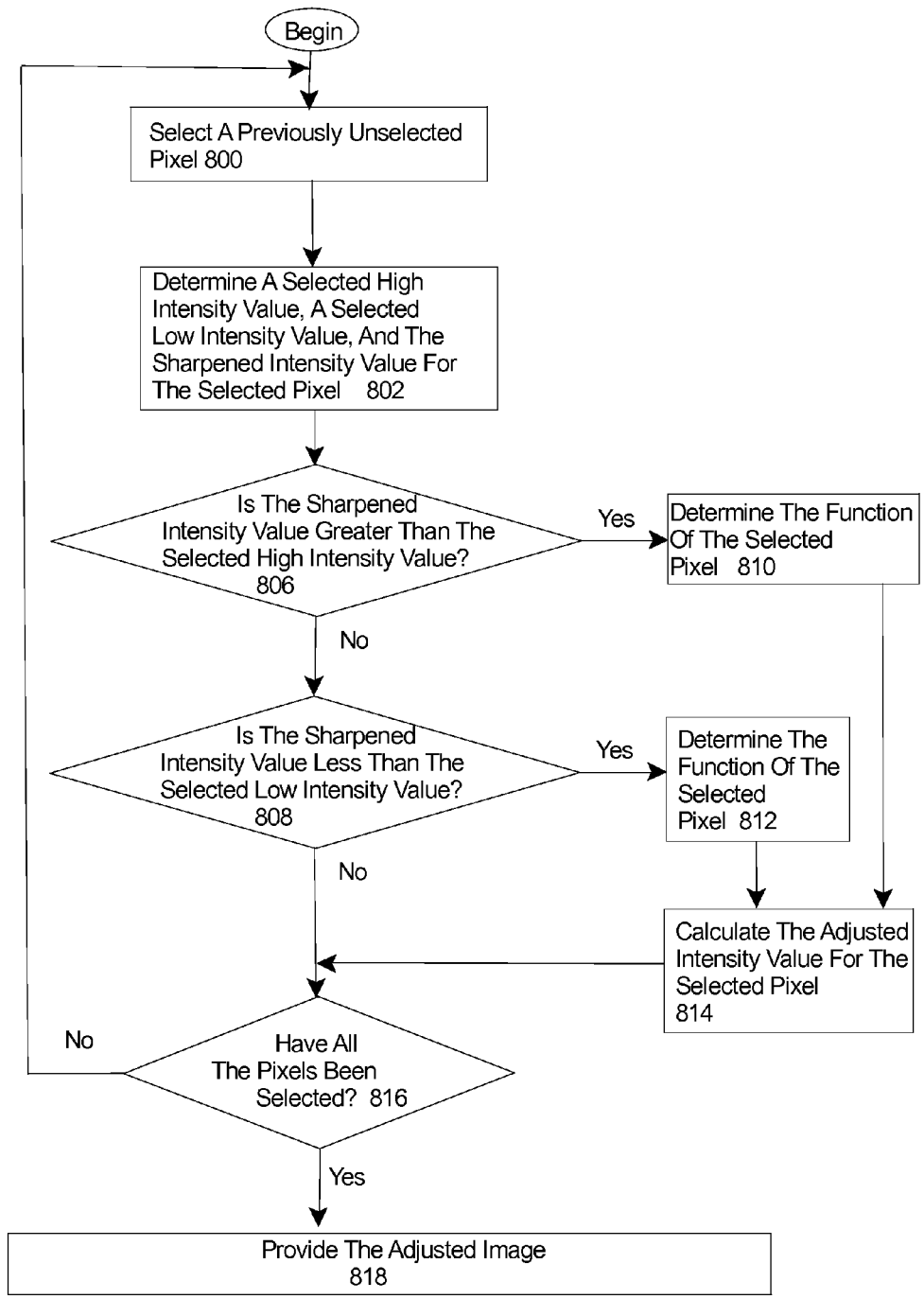
FIG. 8A is a flow chart that illustrates an embodiment for determining an adjusted intensity for an edge pixel.

FIG. 8A is a flow chart that illustrates an embodiment for providing the function overshoot for the captured image. At step 800, a previously unselected pixel is selected. Next, at step 802, the selected high and low intensity values and the sharpened intensity value for the selected pixel are determined. Subsequently, at step 806 the sharpened intensity value is compared to the selected high intensity value, and at step 808 the sharpened intensity value is compared to the selected low intensity value. If the sharpened intensity value is greater than the selected high intensity value, at step 810 the function value for the selected pixel is determined and adjusted intensity value for the selected pixel is determined at step 814. Alternatively, if the sharpened intensity value is less than the selected low intensity value, at step 812 the function value for the selected pixel is determined and adjusted intensity value for the selected pixel is determined at step 814. Next, at step 816, this process is repeated until all of the pixels have been evaluated. After all of the pixels have been evaluated, the adjusted image is provided at step 818.

In one non-exclusive example, the chosen function f can be determined from the following formula:

$$f(x) = \frac{x}{s\left(1 + \left(\frac{x}{sc}\right)^p\right)^{\frac{1}{p}}}$$

In this equation, (i) f(x) is the function value for the selected edge pixel; (ii) x is the size of the original overshoot (e.g. (the sharpened intensity value $p_s(i,j)$ minus the selected high intensity value (H(i,j))) or (selected low intensity value (L(i,j)) minus the sharpened intensity value $p_s(i,j)$); (iii) s is a first parameter; (iv) p is a second parameter; and (v) c is a third parameter. The actual values for each of the parameters can be varied to achieve the desired results. In one non-exclusive example, (i) the first parameter s can be approximately equal to one (s=1) or slightly higher but no more than two; (ii) the second parameter P can have a value of approximately two (the visual results are fairly insensitive to the actual value); and (iii) the third parameter c represents the maximal allowed size of overshoots, so there is a different value for weak and for strong overshoot control (e.g. the weak overshoot control value is about ten times bigger than the one for strong overshoot control for images scaled to have values 0 to 255). For the third parameter c, the typical value for strong overshoot control is around five and for weak overshoot control about fifty (although these values can vary widely).

In this example, the function is a piece-wise linear function that consists of two segments, a linear scaling segment f(x)=k x, followed by the clipping segment which is constant.

In this embodiment, for all x≥0, f(x)<c and hence the parameter c thus represents the maximum allowed size of overshoot, similarly as in the case of clipping. Further, f'(0)= 1/s, which means that small overshoots are reduced by factor approximately 1/s, similarly as when linear scaling by some factor k is applied. The parameter p controls the shape of the curve. When p is large, the curve approaches the piecewise-linear function that corresponds to linear scaling combined with clipping. Smaller values of p, however, produce a more rounded curve that results in more gradual tapering of large overshoots than mere clipping. This helps to produce more naturally looking images with reduced posterization.

In certain embodiments, a separate function value is determined for each pixel that requires overshoot, based at least partly on the sharpened intensity value. Further, in certain embodiments, the adjusted intensity value for each edge pixel is based on the function value and either the selected high intensity value or the selected low intensity value.

Other examples of possible choices of function f include, e.g., appropriately scaled inverse or hyperbolic tangent functions.

Figure 8B:
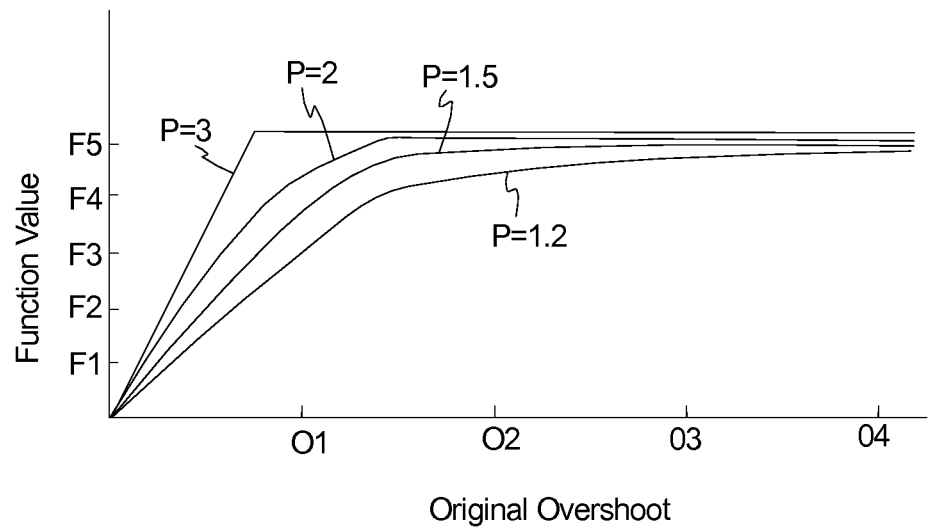
FIG. 8B is a graph that illustrates original overshoot versus a function.

In yet another embodiment, the value of the function can be expressed in a graph as shown in FIG. 8B that illustrates original overshoot versus the function values. In this example, multiple curves are illustrated that represent different values for p. Further, in this graph, c has a value of five, and s has a value of one.

The present invention also provides still another way to perform overshoot control utilizing the selected high intensity value, the selected low intensity value determined as provided above, and the size of the original overshoot to determine a transformed overshoot. This overshoot control is referred to as the transformed overshoot control. In one embodiment, the new intensity value at pixel $p_{new}(i,j)$ is set to be equal to (i) the selected high intensity value $H(i,j)$ plus the transformed overshoot $T(i,j)$, in the event the sharpened intensity value $p_s(i,j)$ is greater than the selected high intensity value $H(i,j)$, or (ii) the selected low intensity value $L(i,j)$ minus the transformed overshoot $T(i,j)$, in the event the sharpened intensity value $p_s(i,j)$ is less than the selected low intensity value $L(i,j)$. This type of overshoot control is expressed in following equations 9 and 10:

$$p_{new}(i,j)=H(i,j)+T(i,j), \text{ if } p(i,j)>H(i,j), \quad \text{Equation 9}$$

$$p_{new}(i,j)=L(i,j)-T(i,j), \text{ if } p(i,j)<L(i,j), \quad \text{Equation 10}$$

In these equations, T represents the transformed overshoot.

Figure 9A:
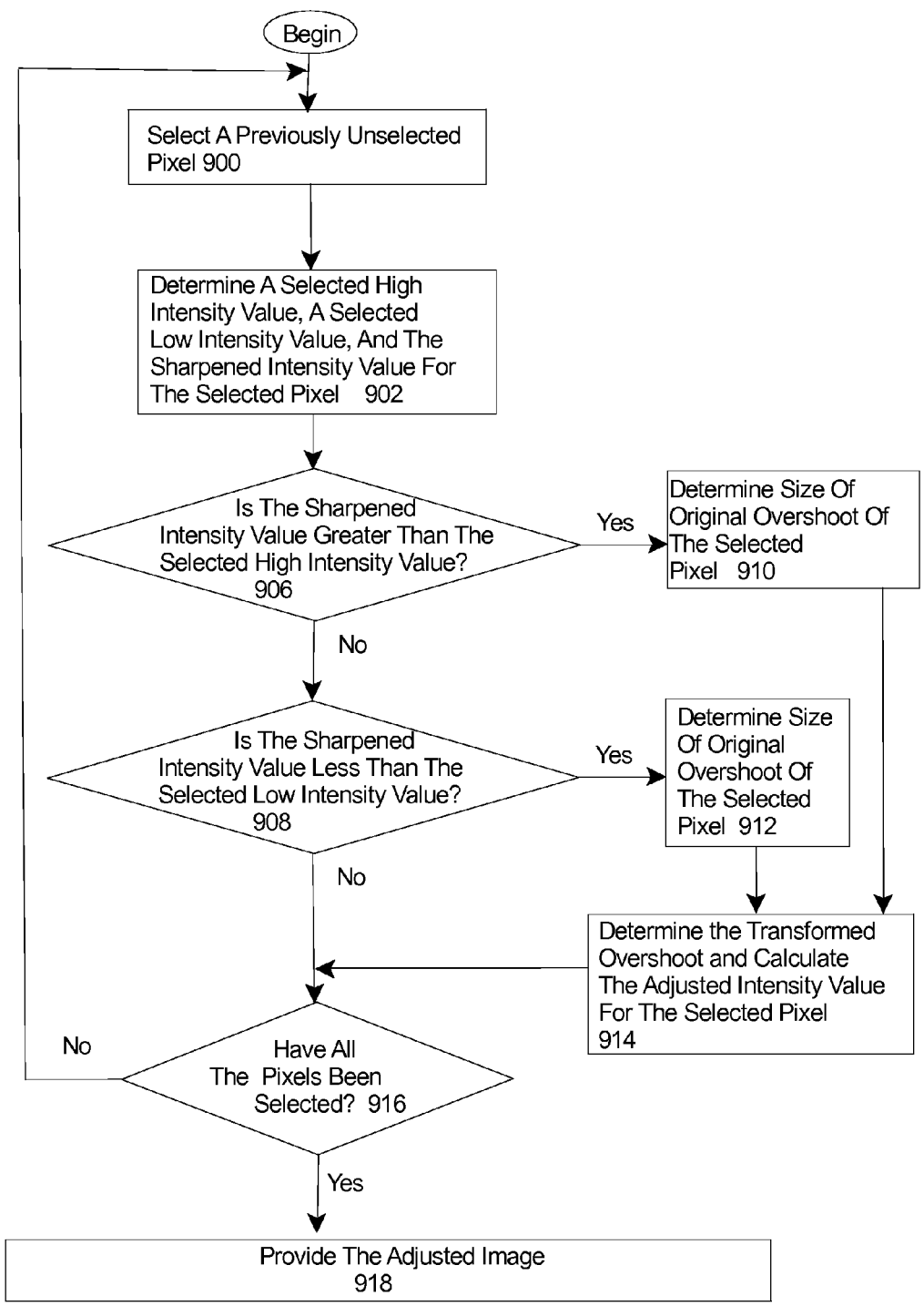
FIG. 9A is a flow chart that illustrates another embodiment for determining an adjusted intensity for an edge pixel.

FIG. 9A is a flow chart that illustrates an embodiment for providing the transformed overshoot for the captured image. At step 900, a previously unselected pixel is selected. Next, at step 902, the selected high and low intensity values and the sharpened intensity value for the selected pixel are determined. Subsequently, at step 906 the sharpened intensity value is compared to the selected high intensity value, and at step 908 the sharpened intensity value is compared to the selected low intensity value. If the sharpened intensity value is greater than the selected high intensity value, (i) at step 910, the original overshoot is determined by subtracting the selected high intensity value from the sharpened intensity value for the selected pixel, and (ii) at step 914, the transformed overshoot is determined and the adjusted, new intensity value $p_{new}(i,j)$ is calculated. Alternatively, if the sharpened intensity value is less than the selected low intensity value, (i) at step 912, the original overshoot is determined by subtracting the sharpened intensity value from the selected high intensity value for the selected pixel, and (ii) at step 914, the transformed overshoot is determined and the adjusted, new intensity value $p_{new}(i,j)$ is calculated.

Next, at step 916, this process is repeated until all of the pixels have been evaluated. After all of the pixels have been evaluated, the adjusted image is provided at step 918.

In certain embodiments, the transformed overshoot is determined for each pixel that requires overshoot based at least partly on the sharpened intensity value. Further, in certain embodiments, the adjusted intensity value for each pixel is based on the transformed overshoot and either the selected high intensity value or the selected low intensity value. In this embodiment, the method disclosed herein again is designed to provide different levels of overshoot control during the sharpening of different pixels.

Figures 9B, 9C:
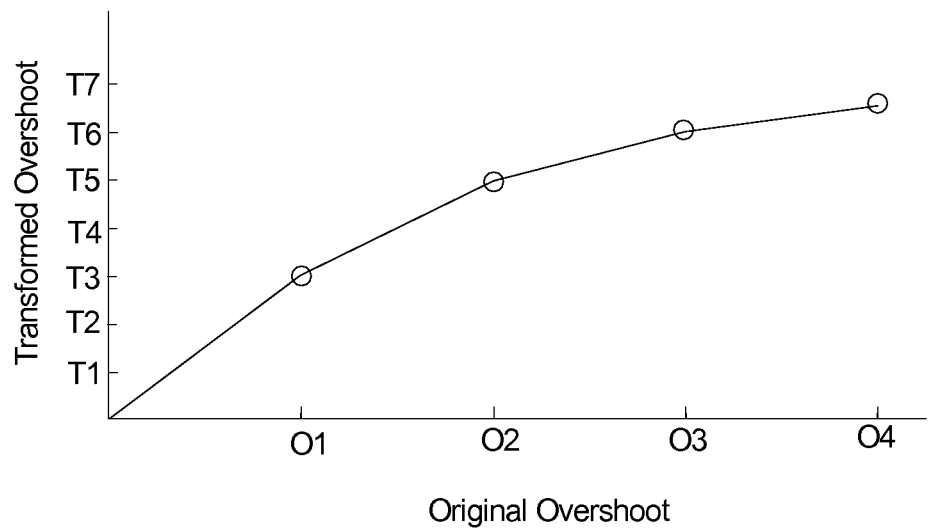
FIG. 9B is a graph that illustrates the relationship between original overshoot and a transformed overshoot.
FIG. 9C is a look-up table that illustrates original overshoot versus transformed overshoot.

Referring to FIG. 9B, in one embodiment, the transformed overshoot can be determined from a graph that plots the original overshoot versus the transformed overshoot. In this embodiment, the shape of the curve in this graph can be changed to change the correlation between the original overshoot and the transformed overshoot. In this embodiment, once the original overshoot is determined, the transformed overshoot can be determined from the graph of FIG. 9B.

In another embodiment, referring to FIG. 9C, the transformed overshoot can be determined from a look-up table that illustrates the relationship between original overshoot and a transformed overshoot. In one embodiment, the look-up table provides a separate transformed overshoot for each original overshoot. Alternatively, to keep the size of the look-up table practical, the look-up table can be designed to contain the transformed value only for certain selected overshoots. For values in between these selected values, interpolation can be utilized. In this embodiment, once the original overshoot is determined, the transformed overshoot can be determined from the look-up table of FIG. 9C.

In yet another embodiment, the present invention another type of overshoot control which is a blend of both weak and strong overshoot control is applied to all of the pixels. This type of overshoot control shall be referred to herein as blended overshoot control. In the previous implementations described above, the amount of overshoot control depended upon whether the pixel was a line pixel or a non-line pixel and there is nothing in between.

Figure 10:
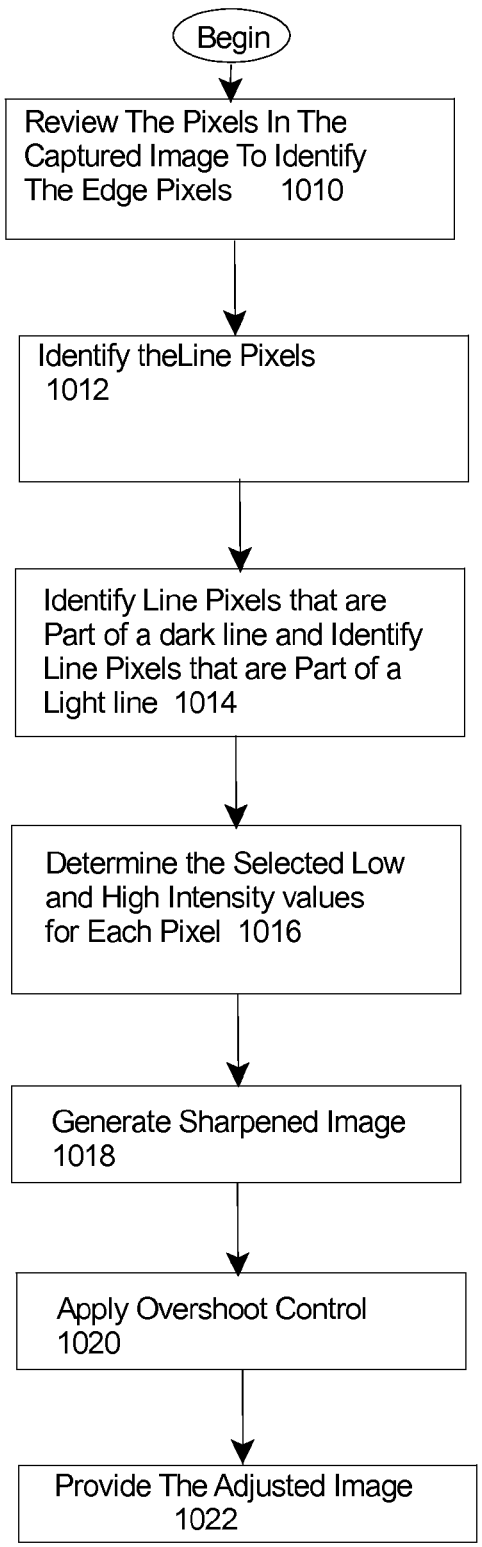
FIG. 10 is a flow chart that illustrates another embodiment of a method for providing an adjusted image.

FIG. 10 is a flow chart that illustrates how the blended overshoot control can be implemented to generate an adjusted image from a blurred image. First, at step 1010, the pixels in the blurred image are evaluated to detect edge pixels in the blurred image. Next, at step 1012, the edge pixels are evaluated to detect the fine lines and label the line pixels. As detailed above, this can be done by searching all of the edge pixels to find pairs of pixels that are close to each other, and that have gradients that are in the opposite directions. Both the edge pixels forming the pair and all pixels that are between them are considered a part of the line and are considered line pixels.

Subsequently, at step 1014, the algorithm evaluates the line pixels to identify and distinguish between line pixels that are part of darker lines (line that is darker than the background nearby) and line pixels that are part of lighter lines (line that is lighter than the background nearby). The line pixels that are part of a darker line are identified as dark line pixels, and the line pixels that are part of a lighter line are identified as light line pixels. As provided above, when the close pair of edge pixels have gradients that face (point) away from each other, these line pixels are part of a darker line. Alternatively, when the close pair of edge pixels have gradients that face (point) towards each other, these line pixels are part of a lighter line.

Next at step 1016, the selected low intensity value ($L(i,j)$), and the selected high intensity value ($H(i,j)$) are determined for each of the pixels in the blurry image. A number of methods that can be used to determine the selected low intensity value and the selected high intensity value were previously described above. Another method for determining the selected low intensity value ($L(i,j)$) and the selected high intensity value ($H(i,j)$) for each pixel is described with reference to FIG. 11. More specifically, FIG. 11 illustrates an alternative blurry pixel window 1102 for a selected edge pixel $(i,j)$ 1104 (at the center of the one by seven grid). In this embodiment, for each edge pixel, a narrow one pixel window is utilized to determine the selected low intensity value ($L(i,j)$) and the selected high intensity value ($H(i,j)$). This shape reduces the computational cost because fewer pixels are being used in the pixel window. In FIG. 11, the window 1102 has a length of seven pixels. Alternatively, the window 1102 can have a length that is greater than or less than seven pixels.

In this embodiment, the shape of window 1102 depends on the direction of edge. For example, the window 1102 can extend in the direction approximately perpendicular to an edge 1106 (illustrated as an arrow) (i.e., along the direction of gradient). For example, if the edge extends generally vertically, (i) the window 1102 extends generally horizontally as illustrated in FIG. 11, and (ii) three pixels to the left of the selected edge pixel, and three pixels to the right of the selected edge pixel cooperate with the selected edge pixel to define the pixel window. Alternatively, for edges that are approximately horizontal, (i) the window extends generally vertically, and (ii) three pixels above the selected edge pixel and three pixels below the selected edge pixel cooperate with selected edge pixel to define the pixel window. Still alternatively, the pixel window can extend at an angle of 45 and 135 degree directions depending upon the orientation of the edge. It should be noted that the terms horizontal and vertical are used merely for reference with the illustration in FIG. 11.

Further, in this embodiment, for pixels that are not edge pixels (e.g. smooth pixels where there is no clear edge direction that could be used as described above), a "dummy" value can be created for the selected low intensity value ($L(i,j)$), and the selected high intensity value ($H(i,j)$). For example, a small constant can be selected, and (i) the selected low intensity value ($L(i,j)$) can be determined by subtracting the small constant from the original intensity value of the selected pixel, and (ii) the selected high intensity value ($H(i,j)$) can be determined by adding the small constant from the original intensity value of the selected pixel. As provided herein, these dummy values are good enough in these regions and it is computationally much faster.

Referring back to FIG. 10, at step 1018, the sharpened image is generated by applying unsharp mask filter to all pixels. In one embodiment, the present invention uses the variation with adaptive gain, where strength of sharpening is different for different pixels. In this embodiment, the smooth regions of blurred image receive less sharpening, so as not to magnify noise, but typically, none of the pixels have a zero gain because that tends to look unnatural.

Subsequently, at step 1020, overshoot control is applied to all of the pixels to adjust sharpened image values, and suppress undesirable overshoots. For example, the blended overshoot control can be applied to the pixels so that weak overshoot control is applied to most of the line pixels and stronger overshoot control is applied to most of the non-line pixels. Finally, the adjusted image is generated at 1022.

In one embodiment of the blended overshoot control, (i) if the sharpened intensity $p_s(i,j)$ is greater than the selected high intensity value ($H(i,j)$) (i.e., when there is brighter overshoot) then Equation 11 below is used to determine the new intensity value $p_{new}(i,j)$; or (ii) if the sharpened intensity $p_s(i,j)$ is less than the selected low intensity value ($L(i,j)$) (i.e., when there is darker overshoot) then Equation 12 below is used to determine the new intensity value $p_{new}(i,j)$.

If $p_s(i,j) > H(i,j)$, then $$p_{new}(i,j) = H(i,j) + \alpha_{light}(i,j) f_{weakOSC}(p_s(i,j) - H(i,j)) + (1 - \alpha_{light}(i,j)) f_{strongOSC}(p_s(i,j) - H(i,j)).$$ Equation 11

If $p_s(i,j) < L(i,j)$, then $$p_{new}(i,j) = L(i,j) - \alpha_{dark}(i,j) f_{weakOSC}(L(i,j) - p_s(i,j)) + (1 - \alpha_{dark}(i,j)) f_{strongOSC}(L(i,j) - p_s(i,j)).$$ Equation 12

As used herein, (i) $\alpha_{dark}$ represents a dark alpha (coefficient) mask in which each pixel is assigned a dark alpha value; (ii) $\alpha_{dark}(i,j)$ represents the dark alpha (coefficient) value at pixel $(i,j)$; (iii) $\alpha_{light}$ represents a light alpha (coefficient) mask in which each pixel is assigned a light alpha value; (iv) $\alpha_{light}(i,j)$ represents the light alpha (coefficient) value at pixel $(i,j)$; (v) $f_{strongOSC}$ represents a strong overshoot control; and (vi) $f_{weakOSC}$ represents a weak overshoot control. FIG. 12A illustrates one embodiment of a four by four dark alpha mask $\alpha_{dark}$ 1210 that represents the mask for just a portion of the blurred image. In one non-exclusive embodiment, the dark alpha mask $\alpha_{dark}$ can be generated for each blurred image by (i) creating a binary dark matrix 1210 for the darker line pixels in the blurred image (e.g. dark line pixels are assigned a value of 1 while the remaining pixels are assigned a value of 0), and (ii) blurring the binary dark matrix 1212 to provide the dark alpha mask $\alpha_{dark}$. As a result thereof, in the dark alpha mask $\alpha_{dark}$, dark line pixels will have a dark alpha value of one or approximately one, while the other pixels will have a dark alpha value of zero or approximately zero. Further, each pixel will have its own dark coefficient value $\alpha_{dark}$.

Somewhat similarly, FIG. 12B illustrates one embodiment of a four by four light alpha mask $\alpha_{light}$ 1212 that represents the mask for just a portion of the blurred image. In one non-exclusive embodiment, the light alpha mask $\alpha_{light}$ can be generated for each blurred image by (i) creating a binary light matrix 1214 for the lighter line pixels in the blurred image (e.g. light line pixels are assigned a value of 1 while the remaining pixels are assigned a value of 0), and (ii) blurring the binary light matrix to provide the light alpha mask $\alpha_{light}$. As a result thereof, in the light alpha mask $\alpha_{light}$, light line pixels will have a light alpha value of one or approximately one, while the other pixels will have a light alpha value of zero or approximately zero. Further, each pixel will have its own light coefficient value $\alpha_{light}$.

It should be noted that in this example, because the dark alpha mask $\alpha_{dark}$ and the light alpha mask $\alpha_{light}$ are created from binary matrixes that are blurred, the transitions between the line pixels and non-line pixels are smoother. This can result is a more pleasing adjusted image. It should be noted that the dark alpha mask $\alpha_{dark}$ and/or the light alpha mask $\alpha_{light}$ can be referred to as a first coefficient mask or a second coefficient mask.

With the present design, for every pixel, some combination of strong and weak overshoot control is performed. Pixels that are considered part of a line (e.g. line pixels) have coefficient $\alpha_{light}$ or $\alpha_{dark}$ (depending on whether it is light or dark line) equal to one or close to one, which means that mostly weak overshoot control is applied there. Further, pixels that are far from any fine line (i.e., non-line pixels such as step-like edges and smooth areas) have $\alpha_{light}$ and $\alpha_{dark}$ equal to 0 or close to 0. This means that mostly strong overshoot control is applied to the non-line pixels. Further, the values between 0 and 1 allow creating seamless transitions and prevent the creation of visible artifacts.

It should be noted that creating two separate coefficients $\alpha_{light}$ and $\alpha_{dark}$ for each pixel is not strictly necessary. If only one map was kept for all lines, simple blurring of binary line map would cause using mostly weak overshoot control along the sides of the line, where it is desired to suppress the overshoots with mostly strong overshoot control there. When a separate mask is kept for dark and light lines, this does not happen. If the line is brighter than the background, then brighter overshoots will be allowed in the vicinity of the line (since $\alpha_{light}$ will be close to 1 and hence mostly weak overshoot control will be applied), while darker overshoots will not be allowed (since $\alpha_{dark}$ will be close to 0 and hence mostly weak overshoot control will be applied). Therefore the brighter overshoot in the middle of the line will be kept and darker overshoots along the sides of such the line will be suppressed, as they should be. Similarly, for a darker line, having separate coefficients causes that darker overshoots in the vicinity are kept (in particular the one in the middle of the line, that makes it look sharper), while the brighter ones (those around the sides of the line, which are undesirable) will be suppressed.

The blended overshoot control can be better understood with an example of its implementation. Referring back to the example disclosed in FIGS. 5A and 5B. For this example, we will provide that the pixel (i,j) 504 is part of a brighter line and the it has a light alpha value $\alpha_{light}(i,j)$ of 0.75.

Using equation 12:

$$p_{new}(i,j)=L(i,j)+\alpha_{light}(i,j)\cdot f_{weakOSC}(p_s(i,j)-L(i,j))+(1-\alpha_{light}(i,j))\cdot f_{strongOSC}(p_s(i,j)-L(i,j))=37+$$
$$0.75\cdot f_{weakOSC}(5)+0.25\cdot f_{strongOSC}(5)=37+$$
$$0.75\cdot 5+0.25\cdot 3=41.5$$

Thus, in this example, the new intensity value at pixel (i,j) is 41.5.

In the foregoing embodiments, the pixel intensity is referred to as if it has a single value. This is true in the case of gray scale images. However, in color images, the intensity of each pixel is actually a combination of individual color intensities. For example, when a RGB color space is used to characterize the pixel color, there is a red color channel intensity, green color channel intensity and blue color channel intensity. In certain embodiments, when a color image is sharpened, the process is repeated for each color channel of each edge pixel. Alternatively, the RGB color image can be transformed to a YCbCr color space, and only the Y channel (which represents image intensity) can be sharpened. Other embodiments could sharpen the chrominance channels Cb and Cr, perhaps with different parameters as Y (because human vision system is more sensitive to sharpness of intensity than the sharpness of chrominance), or an altogether different color space could be used in which one or more channels would get sharpened.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for sharpening a captured image using a processor to perform the following steps:
   identifying a plurality of edge pixels in the captured image;
   reviewing the plurality of edge pixels to identify one or more line pixels in the captured image, and one or more non-line pixels in the captured image; and
   sharpening the captured image utilizing a first level of overshoot control for the one or more non-line pixels, and utilizing a second level of overshoot control for the one or more line pixels, wherein the first level of overshoot control is different than the second level of overshoot control.

2. The method of claim 1 wherein the first level of overshoot control is stronger than the second level of overshoot control.

3. The method of claim 2 wherein the second level of overshoot control provides approximately no overshoot control.

4. The method of claim 1 further comprising the steps of (i) selecting one of the edge pixels, (ii) identifying an intensity value for each of a plurality of neighboring pixels that are positioned near the selected edge pixel in a predetermined pixel window; (iii) reviewing several of the neighboring pixels that have the highest intensity values to select a selected high intensity value for the pixel window; and (iv) reviewing several of the neighboring pixels that have the lowest intensity values to select a selected low intensity value for the pixel window.

5. The method of claim 4 (i) wherein the step of reviewing several of the neighboring pixels that have the highest intensity values includes the step of averaging several of the neighboring pixels that have the highest intensity values to determine the selected high intensity value for the pixel window; and (ii) wherein the step of reviewing several of the neighboring pixels that have the lowest intensity values includes the step of averaging several of the neighboring pixels that have the lowest intensity values to determine the selected low intensity value for the pixel window.

6. The method of claim 4 (i) wherein the step of reviewing several of the neighboring pixels that have the highest intensity values includes the step of selecting one of the second highest intensity value, third highest intensity value or fourth highest intensity value to be the selected high intensity value for the pixel window; and (ii) wherein the step of reviewing several of the neighboring pixels that have the lowest intensity values includes the step of selecting one of the second lowest intensity value, third lowest intensity value, or fourth lowest intensity value to be the selected low intensity value for the pixel window.

7. The method of claim 1 further comprising the steps of (i) selecting one of the edge pixels; (ii) identifying an intensity value for each of a plurality of neighboring pixels that are positioned near the selected edge pixel in a predetermined pixel window; (iii) selecting a selected high intensity value for the pixel window; (iv) selecting a selected low intensity value for the pixel window; (v) determining a function value for the selected edge pixel based at least partly on a sharpened intensity value of the selected edge pixel; and (v) determining a replacement intensity value for the selected edge pixel based at least partly on the function value and one of the selected high intensity value and the selected low intensity value.

8. A method for sharpening a captured image using a processor to perform the following steps:
   selecting a pixel in the captured image, the selected pixel including a plurality of neighboring pixels that are positioned in a predetermined pixel window;
   selecting a selected high intensity value for the pixel window;
   selecting a selected low intensity value for the pixel window;
   sharpening the captured image to establish a sharpened intensity value for the selected pixel;
   determining a function value for the selected pixel based at least partly on the sharpened intensity value; and
   determining an adjusted intensity value for the selected pixel based at least partly on the function value and one of the selected high intensity value and the selected low intensity value.

9. The method of claim 8 wherein the step of determining a function value includes the step of calculating the function value using the sharpened intensity value.

10. A method for sharpening a captured image using a processor to perform the following steps:
    selecting a pixel in the captured image, the selected pixel including a plurality of neighboring pixels that are positioned in a predetermined pixel window;
    selecting a selected high intensity value for the pixel window;
    selecting a selected low intensity value for the pixel window;
    sharpening the captured image to establish a sharpened intensity value for the selected pixel;
    determining an original overshoot for the selected pixel; and
    utilizing the original overshoot to determine a transformed overshoot for the selected pixel.

11. The method of claim 10 wherein the step of determining an original overshoot includes the step of comparing the sharpened intensity value to at least one of the selected high intensity value and the selected low intensity value.

12. The method of claim 10 wherein the step of utilizing the original overshoot includes the step of utilizing a graph that plots original overshoot versus transformed overshoot.

13. The method of claim 10 wherein the step of utilizing the original overshoot includes the step of using a look-up table that provides a separate transformed overshoot for each original overshoot.

14. A method for sharpening a captured image including a plurality of pixels, the method using a processor to perform the following steps:
    identifying a plurality of edge pixels in the captured image;
    reviewing the plurality of edge pixels to identify one or more line pixels in the captured image, and one or more non-line pixels in the captured image;
    generating a first coefficient mask based on which pixels are line pixel and which pixels are non-line pixels; and
    sharpening the captured image utilizing the first coefficient mask to control the magnitude of overshoot control that applied to the line pixels and the non-line pixels.

15. The method of claim 14 wherein the step of generating the first coefficient mask includes the steps of generating a binary map based upon which pixels are non-line pixels and which pixels are line pixels, and blurring the binary map to create the first coefficient mask.

16. The method of claim 14 further comprising the step of reviewing the line pixels to identify which line pixels are dark line pixels and which line pixels are light line pixels.

17. The method of claim 16 wherein the step of generating the first coefficient mask includes the steps of generating a binary map based upon which pixels are dark line pixels, and blurring the binary map to create the first coefficient mask.

18. The method of claim 16 wherein the step of generating the first coefficient mask includes the steps of generating a binary map based upon which pixels are light line pixels, and blurring the binary map to create the first coefficient mask.

19. The method of claim 18 further comprising the step of generating a second coefficient mask that includes the steps of generating a binary map based upon which pixels are dark line pixels, and blurring the binary map to create the second coefficient mask.

20. A method for sharpening a captured image including a plurality of pixels, the method using a processor to perform the following steps:
    identifying a plurality of edge pixels in the captured image;
    reviewing the plurality of edge pixels to identify one or more line pixels in the captured image and one or more non-line pixels in the captured image;
    reviewing the line pixels to identify which line pixels are dark line pixels and which line pixels are light line pixels;
    generating a first coefficient mask based on which pixels are dark line pixels;
    generating a second coefficient mask based on which pixels are light line pixels; and
    sharpening the captured image utilizing at least one of the first coefficient mask and the second coefficient mask to control the magnitude of overshoot control that applied to the line pixels and the non-line pixels.

21. The method of claim 20 wherein the step of generating the first coefficient mask includes the steps of generating a first binary map based upon which pixels are dark line pixels, and blurring the first binary map to create the first coefficient mask; and wherein the step of generating the second coefficient mask includes the steps of generating a second binary map based upon which pixels are light line pixels, and blurring the second binary map to create the second coefficient mask.

* * * * *